United States Patent
Klianev

(10) Patent No.: US 7,272,820 B2
(45) Date of Patent: Sep. 18, 2007

(54) GRAPHICAL DEVELOPMENT OF FULLY EXECUTABLE TRANSACTIONAL WORKFLOW APPLICATIONS WITH ADAPTIVE HIGH-PERFORMANCE CAPACITY

(75) Inventor: Ivan Iliev Klianev, Sydney (AU)

(73) Assignee: Extrapoles Pty Limited, Brighton-Le-Sands NSW (AU)

( * ) Notice: Subject to any disclaimer, the term of this patent is extended or adjusted under 35 U.S.C. 154(b) by 743 days.

(21) Appl. No.: 10/605,465

(22) Filed: Oct. 1, 2003

(65) Prior Publication Data
US 2005/0149908 A1   Jul. 7, 2005

(30) Foreign Application Priority Data
Dec. 12, 2002  (AU) .............................. 2002101031
Jan. 7, 2003   (AU) .............................. 2003100004

(51) Int. Cl.
   *G06F 9/44* (2006.01)
(52) U.S. Cl. ...................... 717/109; 717/101; 717/106
(58) Field of Classification Search ................ 717/100, 717/101, 106, 109, 110–113
See application file for complete search history.

(56) References Cited

U.S. PATENT DOCUMENTS

| | | | | |
|---|---|---|---|---|
| 5,581,691 A | * | 12/1996 | Hsu et al. ...................... 714/15 |
| 6,053,951 A | * | 4/2000 | McDonald et al. .......... 717/109 |
| 6,253,369 B1 | * | 6/2001 | Cloud et al. ................. 717/136 |
| 6,308,163 B1 | * | 10/2001 | Du et al. ......................... 705/8 |
| 6,434,714 B1 | * | 8/2002 | Lewis et al. .................. 714/38 |
| 6,823,515 B2 | * | 11/2004 | LiVecchi ..................... 718/105 |
| 2002/0065701 A1 | * | 5/2002 | Kim et al. ....................... 705/9 |

* cited by examiner

Primary Examiner—Meng-Al T. An
Assistant Examiner—Michael Yaary

(57) ABSTRACT

This invention is about engineering approach to development of transactional workflow applications and about ability of this way produced applications to concurrently process large number of workflow requests of identical type with high speed. It provides methods and articles of manufacture: for graphical development of fully executable workflow application; for producing configuration of class objects and threads with capacity for concurrent processing of multitude of requests of identical type for transactional workflow and for concurrent execution and synchronization of parallel workflow-activity sequences within processing of a workflow request; for application self-scaling up and self-scaling down of its processing capacity; and for real-time visualization of application's thread structures, thread quantity, thread usage, and scaling-enacted changes in threads structure and quantity.

15 Claims, 26 Drawing Sheets

```
#define PROCESS_STEPS   5
#define MAX_STEP_DEPTH  3

BOOL Activity[PROCESS_STEPS][ MAX_STEP_DEPTH]={    TRUE,  FALSE, FALSE,
                                                   TRUE,  TRUE,  TRUE,
                                                   TRUE,  TRUE,  FALSE,
                                                   TRUE,  FALSE, FALSE,
                                                   TRUE,  FALSE, FALSE};
```

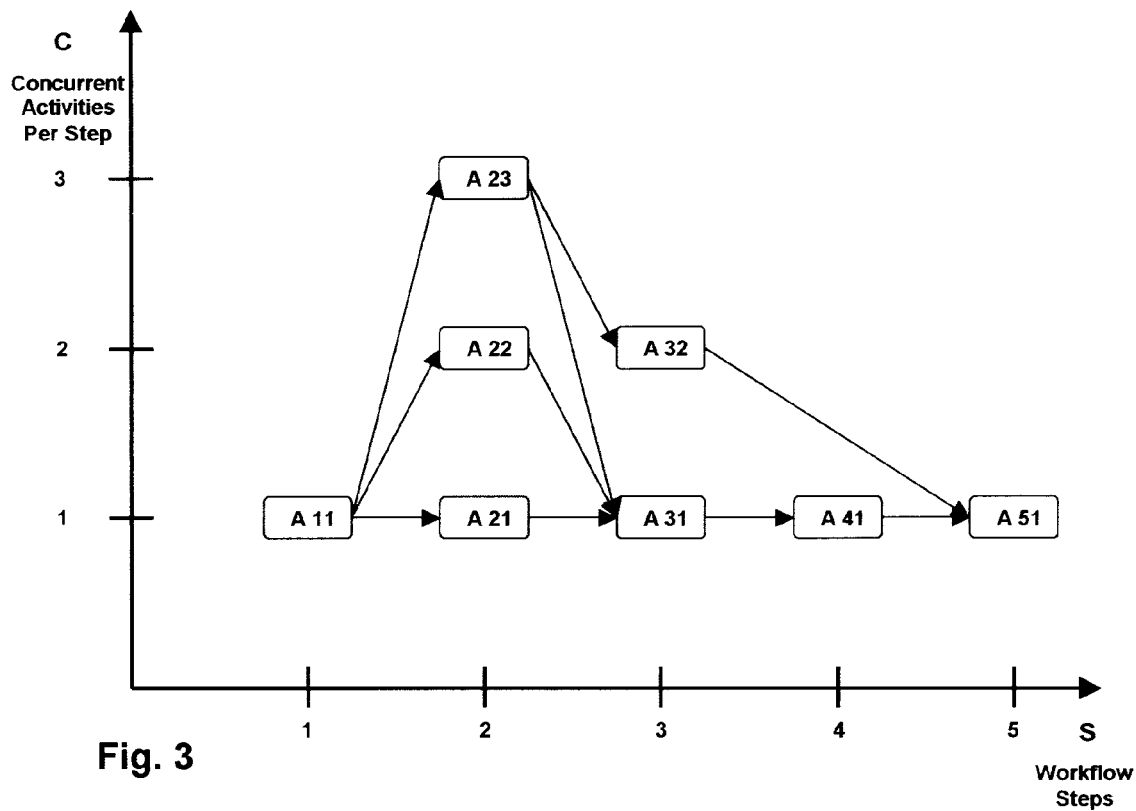

Fig. 3

```
define MAX_CONNECT_OUT 3 int ConnectOut[PROCESS_STEPS-1][ MAX_STEP_DEPTH][ MAX_CONNECT_OUT][2]=
    {
        1, 0,    1, 1,    1, 2,    // Output connections of Activity 11 with array indexes 0,0
       -1,-1,   -1,-1,   -1,-1,    // Activity 12 does not exist
       -1,-1,   -1,-1,   -1,-1,    // Activity 13 does not exist
        2, 0,   -1,-1,   -1,-1,    // Output connections of Activity 21 with array indexes 1,0
        2, 0,   -1,-1,   -1,-1,    // Output connections of Activity 22 with array indexes 1,1
        2, 0,    2, 1,   -1,-1,    // Output connections of Activity 23 with array indexes 1,2
        3, 0,   -1,-1,   -1,-1,    // Output connections of Activity 31 with array indexes 2,0
        4, 0,   -1,-1,   -1,-1,    // Output connections of Activity 32 with array indexes 2,1
       -1,-1,   -1,-1,   -1,-1,    // Activity 33 does not exist
        4, 0,   -1,-1,   -1,-1,    // Output connections of Activity 41 with array indexes 3,0
       -1,-1,   -1,-1,   -1,-1,    // Activity 42 does not exist
       -1,-1,   -1,-1,   -1,-1     // Activity 43 does not exist
    };
```

Fig. 4

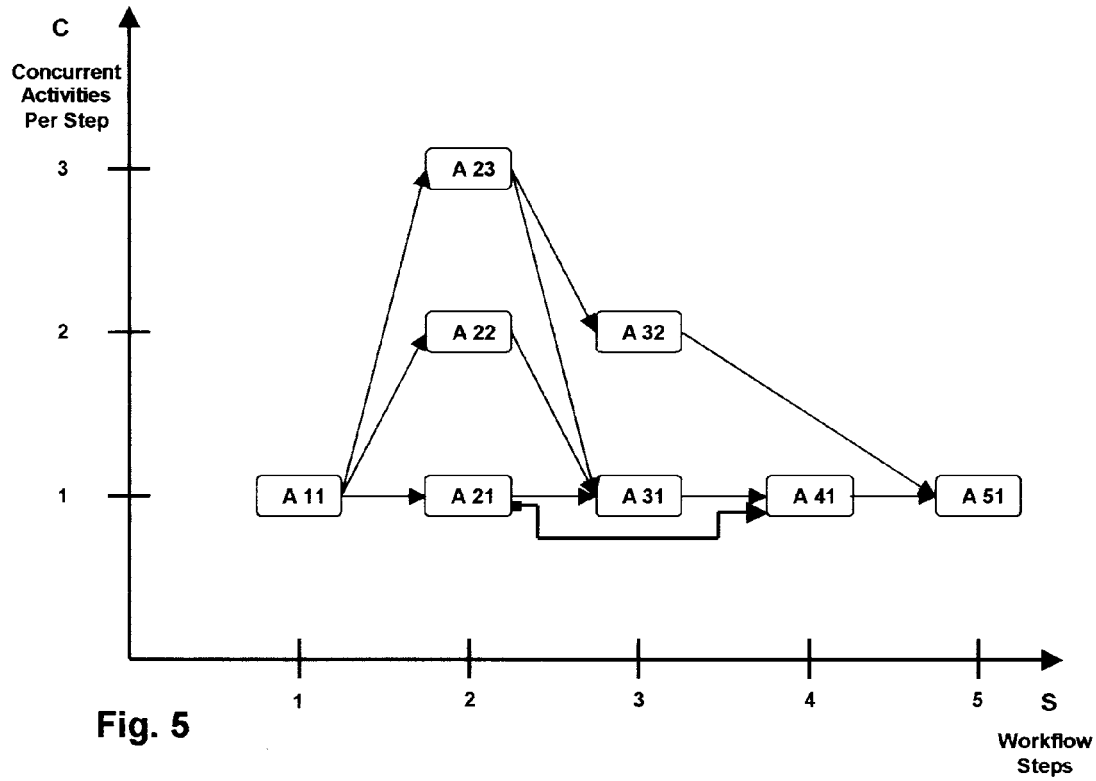

Fig. 5

```
#define MAX_ALTCONNECT_OUT    1
int AltConnectOut[PROCESS_STEPS][ MAX_STEP_DEPTH][ MAX_ALTCONNECT_OUT][2]=
    {
            -1,-1,    // Alternative output connection of Activity 11 with array indexes 0,0 does not exist
            -1,-1,    // Activity 12 does not exist
            -1,-1,    // Activity 13 does not exist
             3, 0,    // Alternative output connection of Activity 21 with array indexes 1,0
            -1,-1,    // Alternative output connection of Activity 22 with array indexes 1,1 does not exist
            -1,-1,    // Alternative output connection of Activity 23 with array indexes 1,2 does not exist
            -1,-1,    // Alternative output connection of Activity 31 with array indexes 2,0 does not exist
            -1,-1,    // Alternative output connection of Activity 32 with array indexes 2,1 does not exist
            -1,-1,    // Activity 33 does not exist
            -1,-1,    // Alternative output connection of Activity 41 with array indexes 3,0 does not exist
            -1,-1,    // Activity 42 does not exist
            -1,-1,    // Activity 43 does not exist
            -1,-1,    // Alternative output connection of Activity 51 with array indexes 4,0 does not exist
            -1,-1,    // Activity 52 does not exist
            -1,-1     // Activity 53 does not exist
    };
```

Fig. 6

```
GUID dummyGUID={0L, 0, 0, {0, 0, 0, 0, 0, 0, 0, 0}};
GUID ActivityGUID[PROCESS_STEPS][ MAX_STEP_DEPTH]=
{
    Guid00,      dummyGUID,    dummyGUID,
    Guid10,      Guid11,       Guid12,
    Guid20,      Guid21,       dummyGUID,
    Guid30,      dummyGUID,    dummyGUID,
    Guid40,      dummyGUID,    dummyGUID
};
```

Fig. 7 ered traffic.

GRAPHICAL DEVELOPMENT OF FULLY EXECUTABLE TRANSACTIONAL WORKFLOW APPLICATIONS WITH ADAPTIVE HIGH-PERFORMANCE CAPACITY

BACKGROUND OF INVENTION

1. Field of Invention

This invention relates to generation, from graphically produced description of workflow process, of source code and compiling and linking instructions of fully executable transactional workflow application with adaptive high-performance capacity for transactional processing of concurrent workflow and its real-time visualization.

Graphically produced description of workflow process represents flow of control between activities included in the workflow process and software components, providing activities' functionality. Generated source code and compiling and linking instructions are used to build transactional workflow application's fully executable code. This way produced executable code is ready to be loaded in computer memory code segments and, after code loading, to run the application by invoking the code loaded in code segments. Foundation of the adaptive high-performance capacity is a hierarchical tree of class objects with ability to represent variety of workflow configurations, and associated to it hierarchical structure of threads, supported by apparatus preventing and neutralizing development of software bottlenecks. The adapting of performance capacity relates to ability to automatically allocate and deallocate system resources, in support to workflow processing, based on application self-assessment of its needs. The extent of application's high-performance capacity is restricted only by environmental factors limiting its self-expansion, such as availability of unused system memory and unused CPU power, and by ability of networking infrastructure to cope with generated traffic.

2. Introduction and Prior Art

In his book discussing next stage of e-business revolution "After the Internet: Alien Intelligence" published in year 2000, James Martin argues that corporations will become part of a broad-ranging global ecosystem involving electronic linkage of diverse enterprises. Electronically linked in ecosystem where everything happens fast, corporations will need capability of reacting in real-time to changes in its environment, competition and customer needs. In that context speed, being an imperative for survival and growth, has two aspects: speed of interaction with partners and customers, and speed of adapting to changes.

Customer-facing e-business applications are expected to respond in realtime to customer requests, to initiate and conduct simultaneous processing of unpredictably high number of user interactions, and be processing-centric, i.e. capable of executing set of related actions structured as transactional workflow. Eventual execution as single transaction, instead as transactional workflow, of all actions related to responding to a step of single user interaction will hold database locks until the transaction is completed or aborted. As a result, even when multiple instances of the same e-business application run concurrently, these instances will perform sequentially—one will hold database locks and all other will wait for database locks to be released. Therefore, the only way to cone with both increased number of concurrent users and increased processing complexity of user interactions while preserving real-time responsiveness is to use workflow systems with capacity for processing of high-volume concurrent transactional workflow.

Ability to adapt to changes in environment, competition, and customer needs implies high-speed of development of e-business systems and flexibility of existing e-business systems for future finegrain changes within limited time. The most flexible solutions, created with known technologies, satisfying those two requirements, are in form of workflow engine, workflow script and workflow activities' software components. A workflow script is a form of description of workflow graph representing sequence of execution of workflow activities. During workflow application running, workflow engine interprets workflow graph description and this results in execution of software components, representing workflow activities, in described sequence. If modifications of a workflow process are needed, desired results are achievable with changes in workflow graph, or components, or both. United States Patent Documents 20020040339, 20020065701, 20020170035, and 20020184616 demonstrate prior art related to concept of workflow engines.

Such flexibility, however, has its price. The price is low efficiency of consumed resources, low processing speed, and lack of concurrency. Even if a hypothetical generic solution, in form of workflow engine, script and components, has ability for concurrent processing of multiple requests, no such solution can compete in respect to efficiency and speed with a proprietary executable application, designed and built for a particular workflow process. What may contribute to increasing workflow application efficiency and speed is any partial or full replacement of interpreted code with executable. Replacement of interpreted code with executable is the approach used with some Java Virtual Machine (JVM) based application servers. The performance improvement, however, does not extend over workflow concurrency because of the inherent concurrency limitations of JVM. With JVM application servers, the only way to process 2 workflow requests concurrently is to concurrently run 2 workflow application instances.

Powerful formal method of development of customizable application source code, for compiling and linking into executable code, is the method of declarative programming. This method allows developers to control, for example, behavior of a class by setting attribute values and by separation of configuration and customization data from class source code. Declarative programming does not require usage of object-oriented languages; it could be a design principle in creation of any application. Prior art exemplifying the concept of declarative programming is demonstrated by technology described in United States Patent Document 20020029376. Workflow engines might arguably be regarded as extreme results of declarative programming and related to it software design concepts.

Another formal method of standardizing software development process is the template-based development of customizable application source code. In contrast to data-driven declarative programming, where software customization happens at run time, implementation of templates performs customization of source code at compile time. This is a strong point in respect to effectiveness of the produced executable code. Price for this effectiveness is reduced flexibility. Unlike the data-driven programming, not all software variations could be expressed with templates.

High-performance capacity for transactional workflow processing means fast and concurrent processing of virtually all simultaneously arriving individual requests for work.

Replacement of interpreted code with executable is the first assumed requirement and proposed step in direction of obtaining desired high-performance capacity. In multi-threading operating system environment, concurrent processing is achievable by creation of sufficient number of threads at each workflow-activity that is part of a workflow process. Therefore, naturally appearing second requirement is to ensure that sufficient number of threads are created and loaded with units of work smoothly and with no delays. Workflow application, experiencing insufficiency of threads or experiencing delays with loading threads with work at any point of the workflow-process, develops software related workflow bottlenecks.

Main reason for software related bottlenecks in a workflow application, processing high-volumes of workload in distributed environment, is application's inability to adjust at run-time the quantity and structure of threads assigned to each one of application's workflow-activities. Quantity and structure of threads should correspond to application needs. Application needs, however, are variable due to variability of working conditions they reflect. Run-time adjustment of threads' structure and quantity is, therefore, the third requirement. Application's working conditions variability might be due to invocation of procedures with response time being function of unpredictable external conditions. For example, invocation of distributed procedure during network congestion or variable response time of services provided by external organizations. Or might be due to unexpectedly high volume of simultaneously arriving requests for work.

Finally, the fourth requirement is to ensure efficient use of system resources. Created workflow application must be able to adapt to different directions of changes in working environment and changing workload. Efficient use of system resources will be ensured when adaptation processes are not single directional and not limited to threads' restructuring only. Therefore, workflow application should be able to expand itself when and where more processing power is needed and to contract itself when and where the additionally acquired processing power is not used.

SUMMARY OF INVENTION

Preferred embodiment of invention's methods related to graphical development of transactional workflow application source code and building instructions is in form of an EXE file and two DLLs. This is invention's first embodiment. One of its DLLs contains components for interactive graphical design of workflow processes and for producing definition of designed workflow process from graphical objects representing the designed workflow process. The other DLL contains components producing custom source code and compiling and linking instructions, sufficient for building transactional workflow applications in form of fully executable code, from a description of a workflow process.

Preferred embodiment of invention's system with adaptive high-performance capacity for processing of concurrent transactional workload is in form of three DLLs. This is invention's second embodiment. Two of its DLLs contain components with functionality enacting the high-performance capacity in for concurrent transactional workload processing of applications created with invention's first embodiment. Third DLL contains components for realtime visualization of workload processing.

This invention overcomes the limitations of known prior art methods for development of custom made application source code for fully executable workflow applications by providing a formal method of development of software source code for fully executable workflow applications. In the preferred embodiment, the generated source code is in attributed Visual C++ and the generated compiling and linking instructions are in form of Microsoft Visual Studio .Net solution (.sln) and project (.proj) files.

Transactional workflow applications, created with invention's first embodiment and using at runtime invention's second embodiment, are different from transactional workflow applications created with prior art in regard to ability for high-volume concurrent processing. Transactional workflow applications created with prior art have inherent concurrency limitations. As Web-accessible business applications must have capacity to serve unpredictably high number of concurrent users, concurrency limitation is a barrier in creation of Web applications processing user interactions with execution of transactional workflow such as, for example, Web-accessible facility for online negotiation of electronic purchases. This invention addresses the need for high-volume concurrent workflow by enabling concurrent processing of 1,000 workflow instances per computer CPU.

This invention's method for graphical development of source code for fully executable workflow applications is different from prior art non-standardized methods for development of software for executable workflow applications. The difference is best demonstrated by the speed of software development process. The speed of software development with the invention's first embodiment is as fast as the speed of development of workflow applications in form of workflow scripts. No workflow application in form of script, however, can possess a capacity for more then just a very limited concurrency.

This invention's system for transactional processing of workflow with a hierarchy of class objects is different from known prior art system for transactional processing of workflow. The main difference is in flexibility of hierarchy of class objects to represent a non-limited number of workflow graphs and thereby to enact a non-limited number of workflow processes.

This invention's method of adaptive high-performance, resulting in application self-scaling of its processing capacity, makes applications, created with invention's first embodiment and using at run-time invention's second embodiment, different from fully executable workflow applications created with known prior art methods of application scaling. The difference is in invention-enacted efficient use of system memory and CPU time. To achieve system resources efficient use, self-scaling of processing capacity up takes place only when and where more processing capacity is needed. Alternatively, self-scaling of processing capacity down takes place when and where there is excessive workflow processing capacity, which is no more needed.

This invention overcomes limitations of known prior art systems for transactional processing of workflow in their ability to counteract development of software related bottlenecks as result of variations of working conditions in distributed application environment. Neutralization of development of software related bottlenecks is enacted by apparatus ensuring that: workflow system is supplied with sufficient number of threads for processing of transactional workload when an insufficiency is generated by communication delays in distributed application environment; and no thread is overloaded with dispatching or supervising work.

This invention overcomes limitations of known prior art systems, in their ability to visualize workflow application's thread structures, threads quantity, and threads usage. Facilitation of real-time visualization will empower workflow application administrators with abilities to evaluate application workload, to detect points of delay caused by distributed infrastructure, and to observe application's scaling-related actions.

BRIEF DESCRIPTION OF DRAWINGS

FIG. 3 is diagram showing sample flow-graph obtained by incorporating control-connectors between nodes of the sample workflow-activities matrix of FIG. 1.

FIG. 4 is C++ source code describing an array representing control-connectors of the sample flow-graph of FIG. 3.

FIG. 5 is diagram showing sample flow-graph obtained by incorporating an alternative control-connector between nodes of the sample flow-graph of FIG. 3.

FIG. 6 is C++ source code describing an array representing alternative control-connectors of the sample flow-graph of FIG. 5.

FIG. 7 is C++ source code describing an array representing Globally Unique Identifiers of software components associated with elements of workflow-activities matrix of FIG. 1.

DETAILED DESCRIPTION

This invention is about engineering approach and speed of development and future modifications of workflow applications and about enabling execution of large number of concurrent business interactions.

Invention provides method for graphical development of fully executable workflow applications. Application's graphical development has two phases: application design phase, where definition of a workflow process is interactively produced, and build phase, producing executable code of a workflow application that will perform in a way described by the definition of workflow process.

The produced at application design phase workflow definition describes flow of control between activities included in the workflow process and declares software components that will provide functionality of workflow-activities. Defining of a workflow-process comprises following steps:

1. Defining workflow-activities matrix.
2. Defining main flow-graph.
3. Defining alternative control-connectors.
4. Defining workflow-components matrix.

Defining Workflow-activities Matrix

Figures 1, 2:
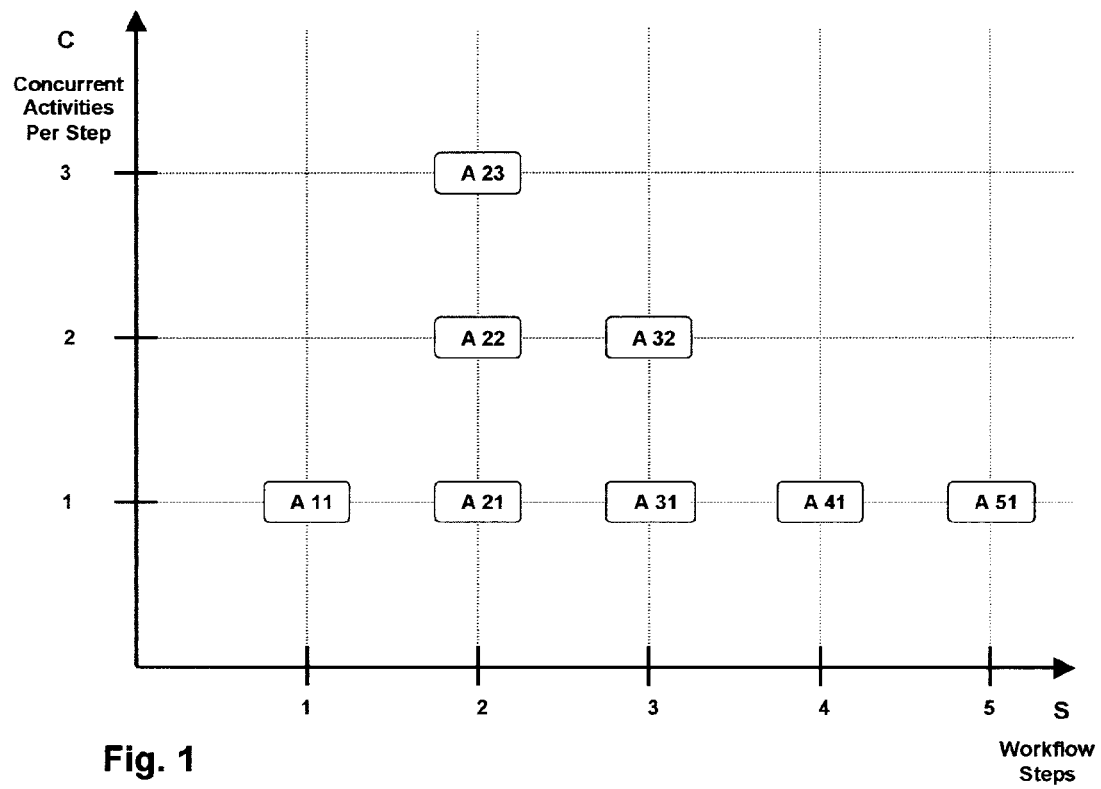
FIG. 1 is diagram showing sample arrangement of workflow-activities matrix of a workflow process, according to required sequence and permitted concurrency of execution within a workflow request.
FIG. 2 is C++ source code describing an array representing the sample workflow-activities matrix of FIG. 1.

Workflow-activities matrix represents decomposition and arrangement of individual items of work within workflow-process according to required sequence of execution and according to permitted concurrent execution of some of them. FIG. 1 is diagram showing sample arrangement of workflow-activities matrix of a workflow process, according to required sequence and permitted concurrency of execution within a workflow request. Horizontal axis S shows workflow process' sequential steps of execution. A11 is the first workflow-activity that will be executed. A51 is workflow process' last activity that will be executed. Vertical axis C shows number of workflow-activities with allowed concurrent execution on each step of the workflow process.

Activities A21, A22, and A23 might be executed concurrently, as well as activities A31 and A32.

In this description, C++ source code is used to present and describe the data extracted on each step of interactive graphical defining of the workflow process. FIG. 2 is C++ source code describing an array representing the sample workflow-activities matrix of FIG. 1. Constant PROCESS_STEPS represents the number of process steps of the workflow-process being defined. Constant MAX_STEP_DEPTH represents maximum number of workflow-activities that might be executed concurrently during processing of single request to workflow application. Boolean array Activity is a map of workflow-activities. Array element Activity [i][j] with value TRUE means that on i-step of the workflow process, on j-concurrency position there is an activity presented, while FALSE means there is no activity presented on position with such coordinates.

Defining Main Flow-Graph

Workflow-activities are represented as nodes of flow-graph by incorporating control-connectors representing potential flow-of-control between nodes within potential workflow-process. Each control-connector in main flow-graph potentially signals successful execution of its sourcing workflow-activity with execution result having value Y, indicating successful execution. Two or more control-connectors sourcing from one node initiate concurrent execution of control-connectors' destination nodes. Two or more control-connectors having a common destination node impose a requirement for synchronizing conjunction of signals of all control-connectors incoming to the common destination node in order to trigger execution of this common destination node.

The sample diagram on FIG. 3 presents two cases of required compulsory synchronization of a workflow-activity execution where synchronization is implicitly required by the flow-graph by having two or more control-connectors with one and the same destination node. As it is shown on the diagram, activity A31 is a destination node of control-connectors starting from activities A21, A22, and A23, while Activity A51 is a destination node of control-connectors starting from activities A32 and A41. The implicitly required synchronization by control-connectors with destination node activity A31 means that execution of activity A31 will be started only after signals of successful execution of activities A21, A22, and A23 have been received. This explains why execution of activity A23 establishing two parallel flows of control might, but not necessarily, lead to concurrent execution of activities A31 and A32—execution of activity A31 might have to wait for execution of activities A21 and A22. Activity A51 will be postponed until both activities A32 and A41 signal their respective successful execution.

FIG. 4 is C++ source code describing an array representing control-connectors of the sample flow-graph of Fir. 3. Constant MAX_CONNECT_OUT represents maximum number of parallel flows of control that might start from one workflow-activity. Control-connectors, starting from a known flow-graph node, are described with coordinates of their destination nodes. An array with dimensions MAX_CONNECT_OUT by 2 bears sufficient information describing all control connectors possibly starting from a particular flow-graph node when its execution result has value Y, indicating successful execution. Having such an array for each one of workflow-activities of a workflow process, with exception of workflow-activity being at the last step of the workflow process, describes the entire main flow-graph of the workflow process, including possible implicit requirements for synchronization of execution of some workflow-activities. Array ConnectOut in the C++ source code integrates all arrays describing control connectors starting from all flow-graph nodes with execution result having value Y of the sample flow-graph of Fir. 3, including dummy control-connectors, presented as having destination nodes with coordinates−1 and−1. Array ConnectOut includes dummy arrays representing dummy nodes for elements of array Activity having values FALSE. Dummy arrays contain descriptions of dummy control-connectors only.

Defining Alternative Control-connectors

Alternative connectors potentially signal successful potential execution of their respective sourcing workflow-activities with execution result having value N, indicating non-successful execution. Two or more alternative control-connectors sourcing from one workflow-activity might initiate concurrent execution of destination workflow-activities of these alternative control-connectors. A workflow-activity having an established requirement for synchronizing conjunction of signals of all incoming to it control-connectors cannot be a destination workflow-activity of an alternative control-connector. Alternative control-connectors might be directed forward or backward, regarding the direction of workflow execution. Backward directed alternative control-connector is the only way to establish loops in workflow execution. Without the ability to establish workflow execution loops and alternative workflow execution routes, this invention's methods and articles of manufacture would have been applicable with task-oriented workflow processing applications only. With the alternative control-connectors, the invention's methods and articles of manufacture are applicable with goal-oriented workflow processing applications as well.

The sample diagram on FIG. 5 is diagram showing a sample flow-graph obtained by incorporating an alternative control-connector between nodes of the sample flow-graph of FIG. 3. The alternative control-connector is the one with source workflow-activity A21 and destination workflow-activity A41. When a workflow-activity does not have defined an alternative control-connector, this implies that the software component providing functionality of that workflow-activity has two possible outcomes: Y, indicating successful execution, and T, indicating conditions requiring termination of processing of a particular request. Workflow-activity execution outcome T is always presented. It always leads to termination of a request and, therefore, there is no real need to present it graphically.

FIG. 6 is C++ source code describing an array representing alternative control-connectors of the sample flow-graph of Fir. 5, where there is just one alternative control-connector. Constant MAX_ALTCONNECT_OUT represents maximum number of alternative control-connectors that might start from one workflow-activity. If MAX_ALTCONNECT_OUT has value 0, a flow-graph has no alternative control-connectors. Alternative control-connectors, starting from a known flow-graph node, are described with coordinates of their destination nodes. An array with dimensions MAX_ALTCONNECT_OUT by 2 bears sufficient information describing all control connectors possibly starting from a particular flow-graph node when its execution result has value N, indicating non-successful execution. Having such an array for each one of workflow-activities of a workflow process describes all alternative control-connectors of the workflow process. Array AltConnectOut in the C++ source code integrates all arrays describing alternative control connectors starting from all flow-graph nodes with execution result having value N of the sample flow-graph of Fir.

5, including dummy control-connectors, presented as having destination nodes with coordinates−1 and−1. Array AltConnectOut includes dummy arrays representing dummy nodes for elements of array Activity having values FALSE. Dummy arrays contain descriptions of dummy alternative control-connectors only.

Defining Workflow-components Matrix

Preparing of a set of software components, each one associated with a workflow-activity of the workflow process, is the final part of a workflow process defining. FIG. 7 is C++ source code describing an array representing Globally Unique Identifiers of software components associated with elements of workflow-activities matrix of FIG. 1. The initialized dummyGUID variable of type GUID is to be used to represent dummy GUIDs. The array of type GUID ActivityGUID is initialized by providing the Globally Unique Identifier of the software component providing the workflow-activity functionality for every element of array Activity having value TRUE, and alternatively with a dummyGUID for every element of array Activity having value FALSE.

At application generation phase, definition of a workflow process is used to generate application source code and compiling and linking instructions for building of application executable code. In the preferred embodiment, the generated source code is in attributed Visual C++ and the generated compiling and linking instructions are in form of Microsoft Visual Studio .Net project (.proj) file being part of a Microsoft Visual Studio .Net solution (.sln) file.

Figure 8:
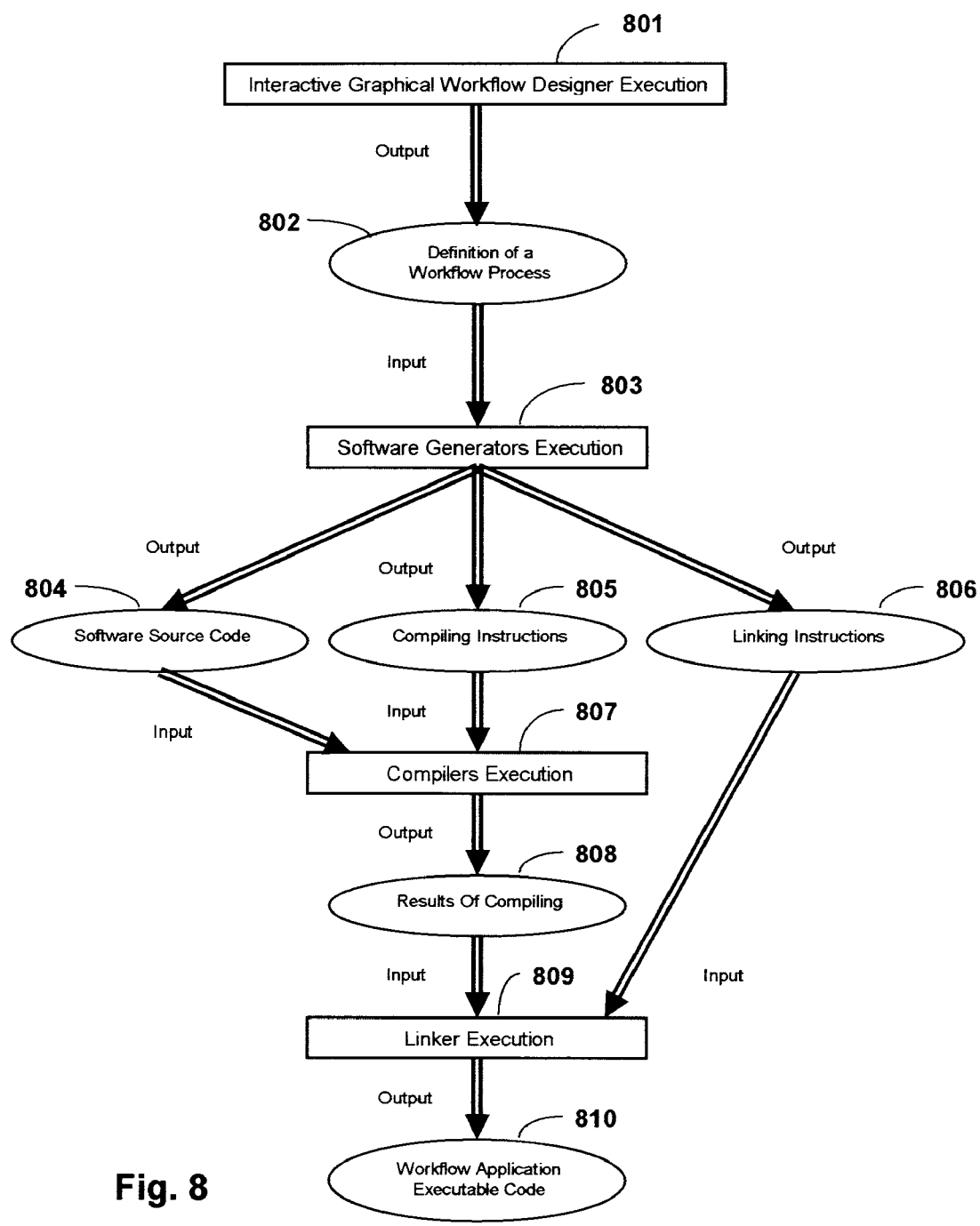
FIG. 8 is block diagram of design, generation and building of a workflow application.

FIG. 8 is block diagram of graphical development of a workflow application. Using a tool for graphical development of workflow applications, a workflow application architect interactively executes workflow designer 801 and produces a definition of a workflow process 802. Execution of software generators 803 takes as input a data set being a definition of a workflow process 802. Result of execution of software generators 803 includes: source code 804 of workflow application that after being compiled, linked, installed, and executed will behave according to the definition of a workflow process 802; compiling instruction 805 necessary for compiling the generated source code 804; linking instructions 806 for producing application's executable code from results of execution of compiling instructions 805. Software source code generation is result of both analysis of description of desired workflow and knowledge of the embodiment of the rest of this invention. Generated software source code is responsible for customizable part of workflow application, dealing with application initialization and termination. The customizable part of application initialization facilitates construction of hierarchical trees of objects and hierarchical structure of threads. Source code generation involves usage of source code templates, class templates, and pure generation of source code by created for this purpose program executable code, where elements of workflow definition are passed as input parameters of execution of this executable-code-provided functionality. Once results of execution of software generators 803 are obtained, compilers 807 are executed according to compiling instruction 805 taking as compilers' input generated source code 804 and results of compiling 808 are provided as input to linker execution 809 according to linking instructions 806 to produce workflow application executable code 810.

Figure 9:
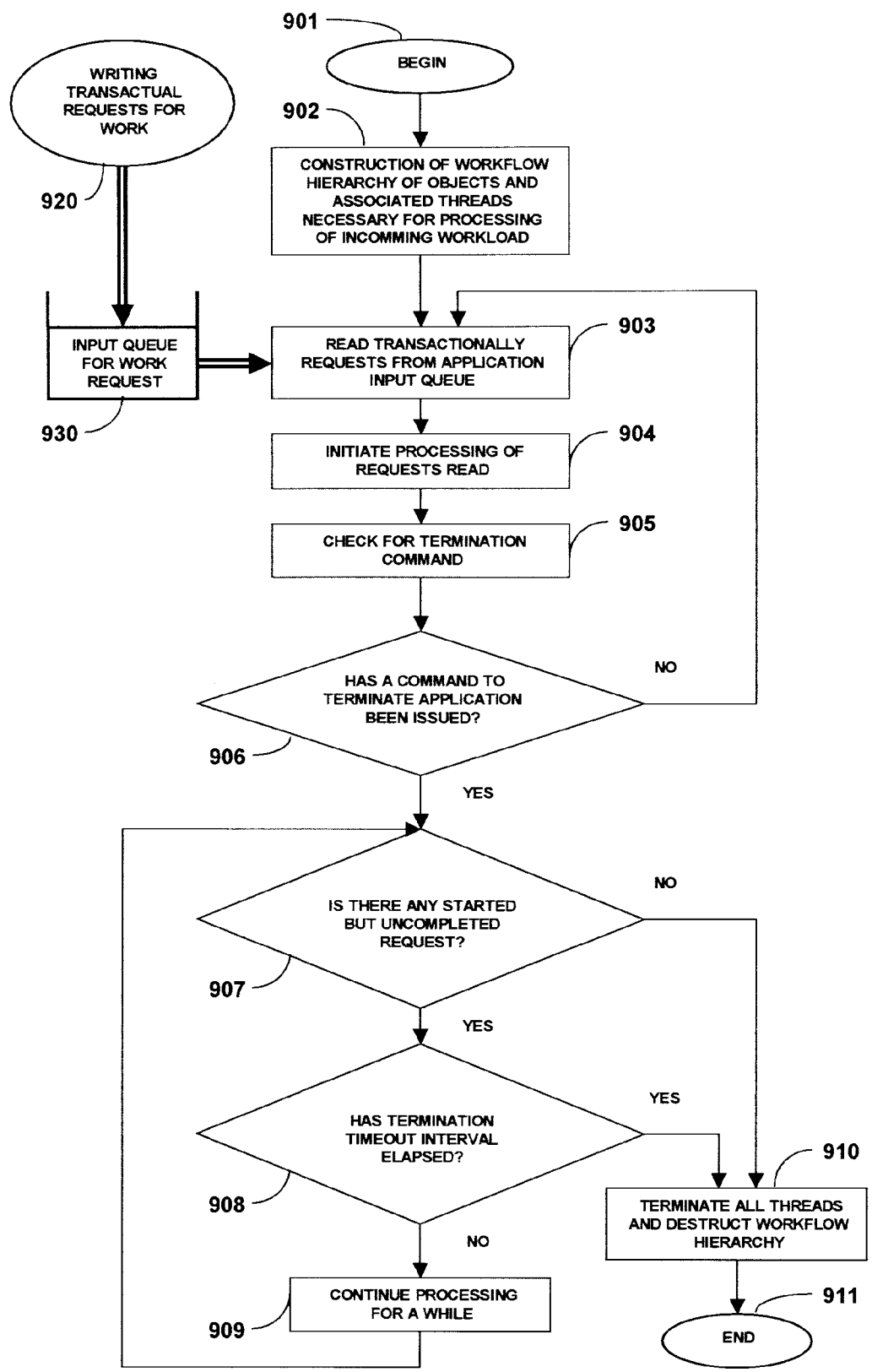
FIG. 9 is flowchart showing preferred minimum set of steps performed by workflow application.

FIG. 9 is flowchart showing preferred minimum set of steps performed by workflow application. The first performed step 902 includes construction of a hierarchical tree of class objects and creation and activation of associated threads that will conduct the actual workload processing work. After threads are activated, the workflow application is ready for processing incoming requests and gets into workload processing loop starting with step 903. Independently of the workflow application, another application asynchronously writes requests for work 920 to workflow application Input Queue 930. At step 903, application reads all requests available in its Input Queue 930. At next step 904 application initiates processing of requests read at step 903. After processing of requests has been initiated it is responsibility of the hierarchy of objects and their associated threads to conduct transactional transmission of control between nodes representing workflow-activities and concurrent transactional execution of the software component associated with a workflow activity until requests are successfully processed or terminated. Without waiting the initiated processing of requests to be completed, application continue, in parallel with processing of requests, with step 905 checking for termination command for it. If a termination command has not been issued, the next step 906 testing will give result NO and execution will continue with step again 903 reading all requests available in application's Input Queue 930. If a termination command has been issued, application will get into its terminating loop starting with step 907. At step 907 the application checks whether there are any started but uncompleted requests. If the result is YES, next performed step is 908, checking whether the interval of time available for application to complete its uncompleted requests has elapsed. If the result is NO, next performed step is 909. On step 909 application, on the foreground, just waits for a while before going to step 907, but on the background it continues with processing of uncompleted requests. If the result on step 907, checking whether there are any started but uncompleted requests is NO, or the result of step 908 checking whether the interval of time available for application to complete its uncompleted requests has elapsed, next executed step is 910 terminating all threads and destructing workflow hierarchy of class objects, followed by execution of step 911 terminating the entire application.

Invention further includes a system with capacity for concurrent processing of multitude of transactional workflow requests of identical type. Core of this system is hierarchy of class objects with capacity to represent variety of workflow configurations and associated structure of threads with capacity for concurrent processing of multitude of workflow requests. In preferred embodiment, the workflow control-connectors and the not-mentioned-yet workflow notification-connectors are implemented as transactional MSMQ messages.

In the hierarchical tree of class objects with capacity to represent variety of workflow configurations, class objects are computer memory instances of classes or structures. Any level of the hierarchical tree contains one or multiple collections. Each collection contains predefined or dynamically defined number of one or multiple objects. Objects belonging to collections of same hierarchy level are computer memory instances of classes or structures of identical type. First level of the hierarchical tree consists of a single collection and every next level of hierarchy contains one or multiple collections and possibly individual objects, wherein collections and individual objects are accessible via references controlled by objects belonging to collections from previous level.

Figure 10:
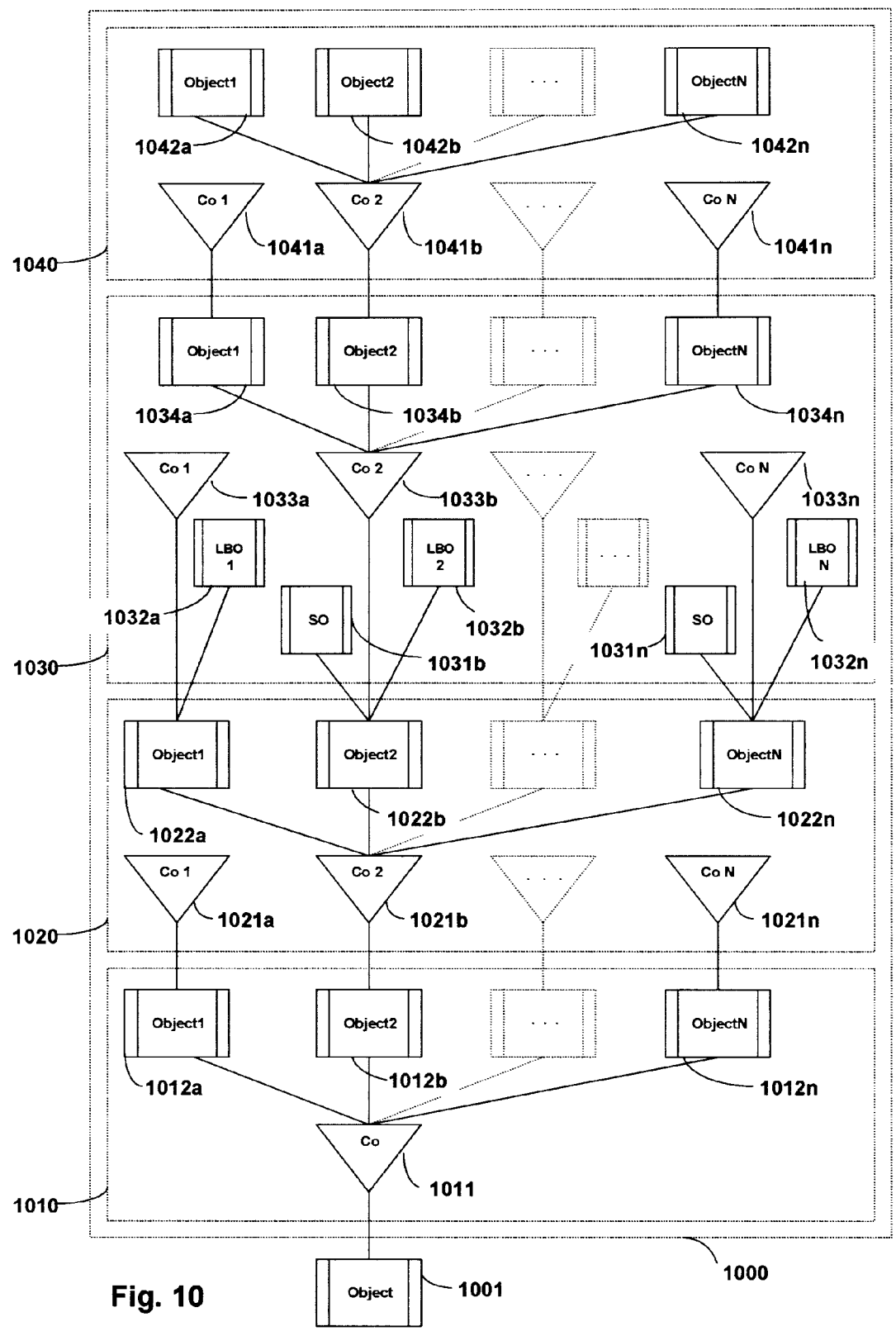
FIG. 10 is block diagram of hierarchical tree of class objects with capacity to represent variety of workflow configurations.

FIG. 10 is block diagram of hierarchical tree of objects. A reference to hierarchical tree 1000 is controlled by workflow object 1001. Objects belonging to any collection of same hierarchy level are computer memory instances of classes or structures of identical type. First level 1010 of the hierarchical tree 1000 consists of a single collection 1011. The reference to hierarchical tree 600 is practically a reference to collection 1011. Collection 1011 contains compile-time defined number of one or multiple objects 1012. Collection objects 1012 represent steps of the workflow-process. Each object 1012 is parent of a collection 1021 belonging to Second level 1020 of hierarchical tree 1000. Every collection 1021 contains compile-time defined number of one or multiple objects 1022. Collection objects 1022 represent workflow-activities that might be executed in parallel at the step of the workflow-process represented by collection parent object 1012. Each object 1022 is parent of a collection 1033 belonging to Third level 1030 of hierarchical tree 1000, parent of a workload-dispatching object 1032, and optionally, parent of a workflow-synchronizing object 1031. Every collection 1033 contains run-time established number of one or multiple objects 1034. Collection objects 1034 represent workload-processors that might be assigned responsibility for processing part of the workload incoming to workflow-activity represented by the parent object 1022 of collection 1033. The optional workflow-synchronizing object 1031 having parent object 1022 is presented when synchronization is required e.g. when more then one control-connectors being of main flow-graph have a destination node represented by parent object 1022. A workload-dispatching object 1032 is responsible for balancing of workload, incoming to workflow-activity represented by its parent object 1022, between workload-processors represented by objects 1034 belonging to collection 1033 having the same parent object 1022. Each object 1034 is parent of a collection 1041 belonging to Fourth level 1040 of hierarchical tree 1000. Every collection 1041 contains compile-time defined number of one or multiple processing-thread-dedicated objects 1042. Number of objects 1042 belonging to collection 1041 is equal to number of threads in private pool of threads belonging to workload-processor object 1034 being parent to collection 1041. A processing-thread-dedicated object 1042 is assigned to every thread in private pool of threads belonging to workload-processor object 1034 being parent to collection 1041. A processing-thread-dedicated object 1042 represents a dedicated area for data holding and data exchange between a particular workload processing thread and its supervising thread.

Splitting of a control flow launches one or more new parallel control flows. Launched parallel control flow comprises execution of at least one workflow-activity, or sequence of plurality of workflow-activities, before merging with its launching, or other, flow of control. The parallel control flow might optionally launch one or more new parallel control flows. Two of more parallel control flows merging together impose a requirement for synchronization of merging parallel control flows within the same request execution before execution of next in flow-graph workflow-activity according to synchronization scheme. Synchronization scheme requires a conjunction of events signaling completed execution of all workflow-activities represented by sourcing nodes of two or more flow-graph control connectors with destination node being the workflow-activity that will be executed after the synchronization as part of a potential single workflow-request. Implementation of synchronization applies to the entire multitude of concurrently processed potential workflow-requests.

A workflow-activity, that is part of a parallel control flow, sends notifying messages about its potential execution with result T to synchronizing threads presented at parallel control flows join-points where this flow control, or one or more of its split branches, participates directly. Direct participation in a join-point is participation where between the workflow-activity and the join-point there is no other join-point. For example, on the sample flow-graph shown on FIG. 11, workflow-activities A21 and A22 directly participate in just one join-point—the one happening before execution of workflow-activity A31, while workflow-activity A23 directly participates in two join-points—the one happening before execution of workflow-activity A31 and the one happening before execution of workflow-activity A51. Similarly, synchronizing thread potentially terminating a potential execution of a parallel control flow sends notifying messages about happening termination to synchronizing threads presented at parallel control flows join-points, where control flow being terminated, or one or more of its split branches, participates directly.

Figure 11:
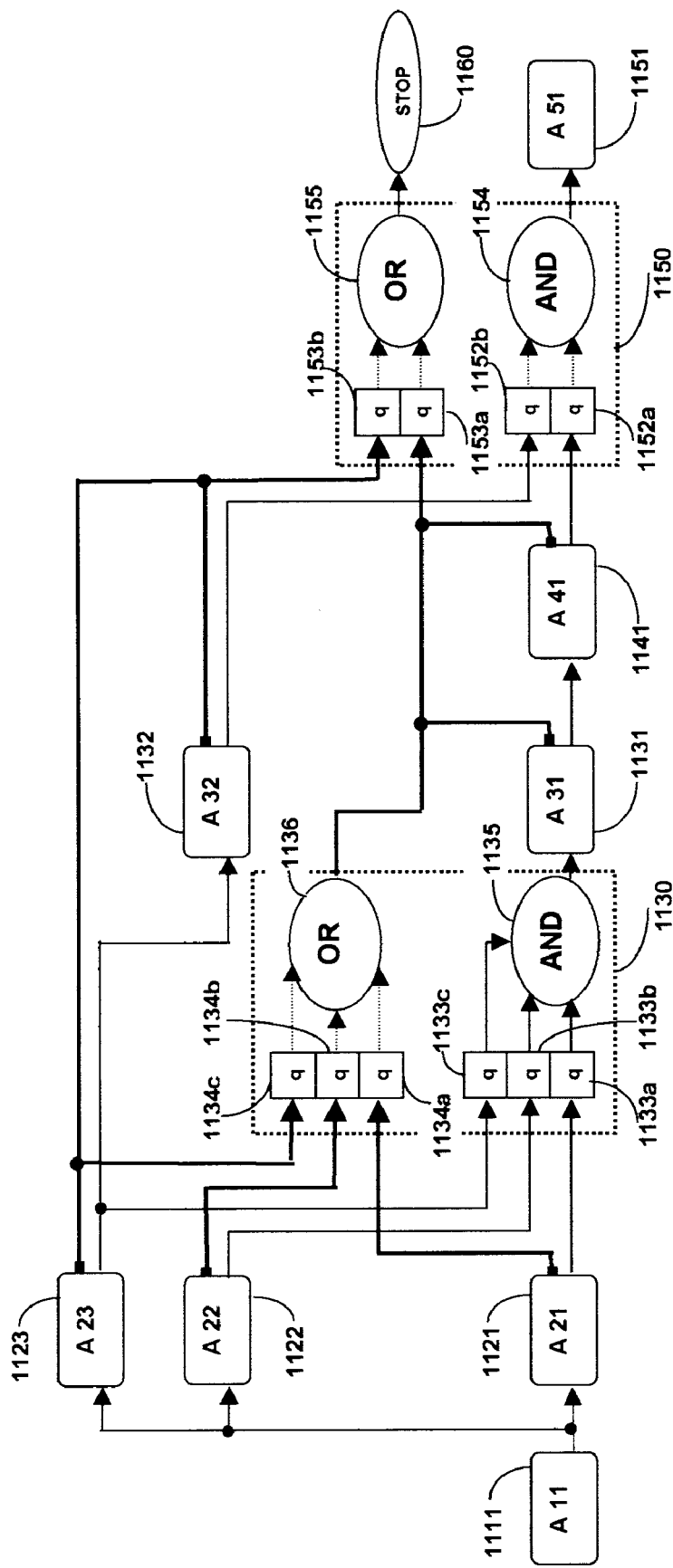
FIG. 11 is diagram showing sample flow-graph obtained by incorporation of notification-connectors between nodes of sample flow-graph of FIG. 3 and by presentation of synchronizing threads as separate flow-graph nodes.

FIG. 11 shows sample flow-graph obtained by incorporation of notification-connectors between nodes of sample flow-graph of FIG. 3 and by presentation of synchronizing threads as flow-graph nodes being sourcing nodes of notification-connectors and control-connectors. Notification-connectors are necessary where parallel control flows exist in a workflow diagram. Connectors presented with thick line on FIG. 11 are notification-connectors, while connectors presented with thin line are control-connectors. Part of flow-graph node representing synchronizing thread 1130 is a group of control queues 1133a, 1133b, and 1133c, and a group of notification queues 1134a, 1134b, and 1134c. Part of flow-graph node representing synchronizing thread 1150 is a group of control queues 1152a, and 1152b, and a group of notification queues 1153a, and 1153b. Control queues receive control flow messages signaling potential execution of their respective workflow-activities with result Y, indicating successful execution. Notification queues receive notification messages signaling potential execution of their respective workflow-activities with result T, indicating condition requiring termination of the respective request execution. Notification messages support termination of parallel control flows at points of synchronization. Notification-connector, having synchronizing thread 1130 as source node and notification queue 1153a, signals terminated execution of parallel control flow between workflow-activities A31, A41, and A51. Notification-connector, having workflow-activity A23 as source node and notification queue 1153b, signals terminated execution of parallel control flow between workflow-activities A23, A32, and A51. Each synchronizing thread has two logical elements. For example, logical element 1135 triggers execution of workflow-activity A31 when each one of workflow-activities A21, A22, and A22 was executed as part of a particular workflow request with result Y. Logical element 1136 triggers sending of a notification about terminated control flow execution when just one of workflow-activities A21, A22, and A22 was executed as part of a particular workflow request with result T. This notification makes sure that workflow-activity A51 will not be executed, workflow request execution will be terminated, and messages related to terminated request will be purged from their respective queues.

A control-connector, which links a workflow-activity execution with result having value N to execution of another workflow-activity, is an alternative control-connector launching an alternative control flow route. Such launching redirects workflow execution from its normal route by transferring execution control to a workflow-activity via an alternative route. Workflow-activity, which is a destination node of an alternative control-connector, must be activity with a non-synchronized execution. Even though a workflow-activity with synchronized execution cannot be a destination node of an alternative control-connector, workflow activities following the workflow-activity that is a destination node of the alternative control-connector might be with synchronized execution.

Figure 12:
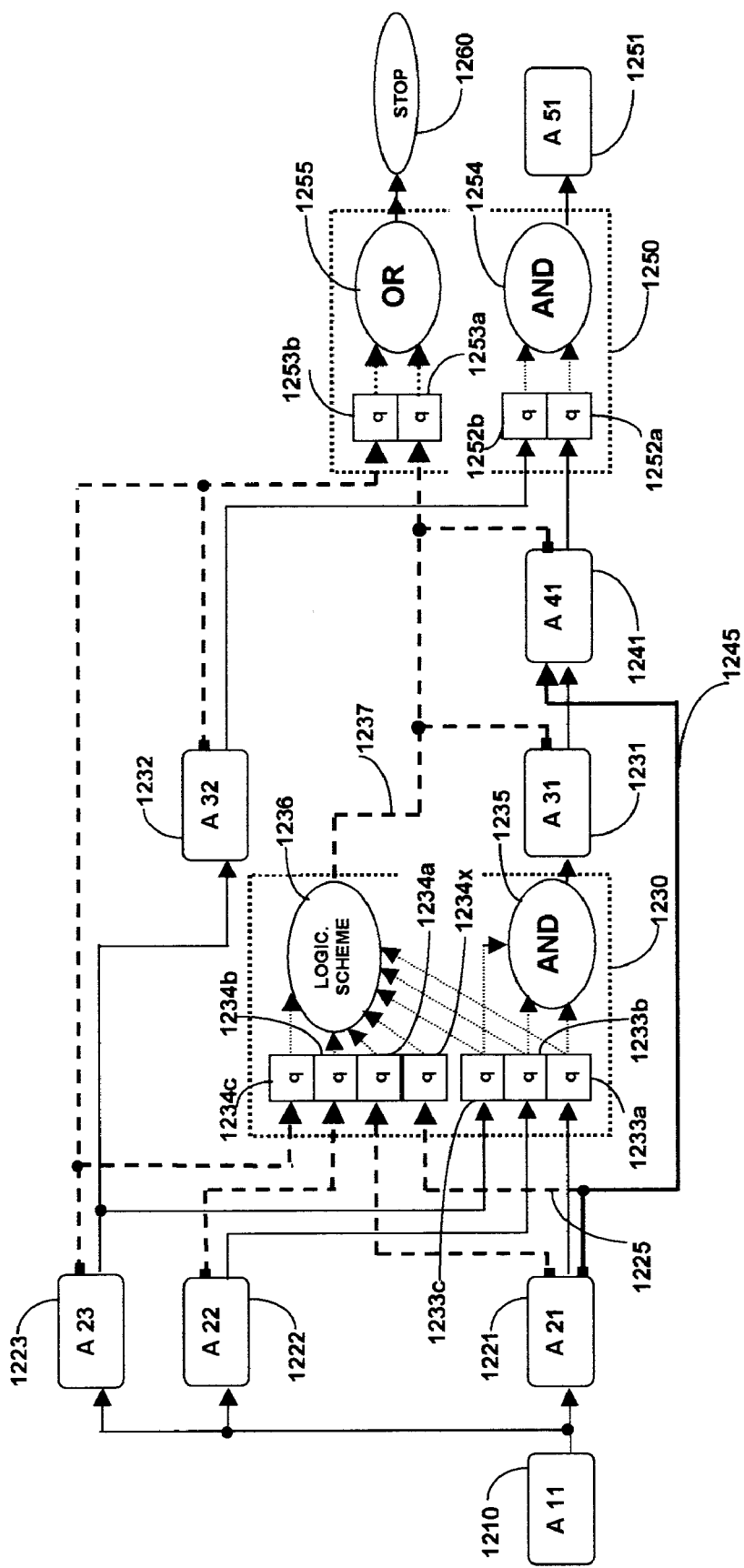
FIG. 12 is diagram showing sample flow-graph of FIG. 11 after incorporation of an alternative control-connector between its nodes.

FIG. 12 is diagram showing sample flow-graph of FIG. 11 after incorporation of an alternative control-connector between its nodes. Connector presented with thick line on FIG. 12 is alternative control-connector; connector presented with thick broken line are notification-connectors; and connectors presented with thin line are control-connectors. Potential execution of workflow-activity A21 with result N will be signaled to control-flow message queue of workflow-activity A41 via the alternative control-connector 1245 and to notification queue 1234x via a notification-connector. Rule governing notification-connectors coupling with an alternative control-connector is: when an alternative control-connector bypasses one or more synchronized activities, which otherwise might have been potentially executed, these synchronized activities must be directly notified about that. Incorporation of the alternative control-connector 1245 in the flow-graph entails a necessary complication of logical element 1236. Logical scheme representing the entire set of possible input (A21, A22, A23) and output (control-connector to A31, notification-connector to A51) messages of synchronizing thread 1230 is presented at Table 1 below:

TABLE 1

| | Input: | | | | | | | | | | | |
|---|---|---|---|---|---|---|---|---|---|---|---|---|
| A21 execution result | Y | Y | Y | Y | N | N | N | N | T | T | T | T |
| A22 execution result | Y | Y | T | T | Y | Y | T | T | Y | Y | T | T |
| A23 execution result | Y | T | Y | T | Y | T | Y | T | Y | T | Y | T |
| | Output: | | | | | | | | | | | |
| Control Connector to A31 | YES | NO | NO | NO | NO | NO | NO | NO | NO | NO | NO | NO |
| Alternative Control Connector to A41 | NO | NO | NO | NO | YES | YES | YES | YES | NO | NO | NO | NO |
| Notification Connector to A51 | NO | YES | YES | YES | NO | NO | NO | NO | YES | YES | YES | YES |

According to Table 1, workflow-activity A31 of flow-graph of FIG. 12 will be executed when all A21, A22, and A23 have execution result Y. Alternative control-connector 1245 will be used to skip execution of workflow-activity A31 and execute directly workflow-activity A41 when workflow-activity A21 has execution result N; in this case execution results of A22 and A23 are ignored; The notification-connector 1237 starting from logical element 1236 will be used to send notifying message to notification queue 1253a when A21 execution result is not N and at the same time execution results of at least one of A21, A22, or A23 is T.

Invention's capacity for concurrent processing of workflow is enabled by hierarchical structure of threads with four levels. The hierarchical structure levels below top level are organized as multitude of horizontally arranged divisions. Each division is autonomous and self-contained in conducting its tasks. Top level thread is responsible for making adaptive decisions, and executing and supervising adaptive behavior related to allocation and de-allocation of system resources based on its own assessment of application needs and goals. The provided by threads of the hierarchical structure capacity for concurrent processing of multitude of requests is limited only by environmental factors such as availability of reserve of system memory and unused CPU power and ability of networking infrastructure to cope with generated traffic.

Figure 13:
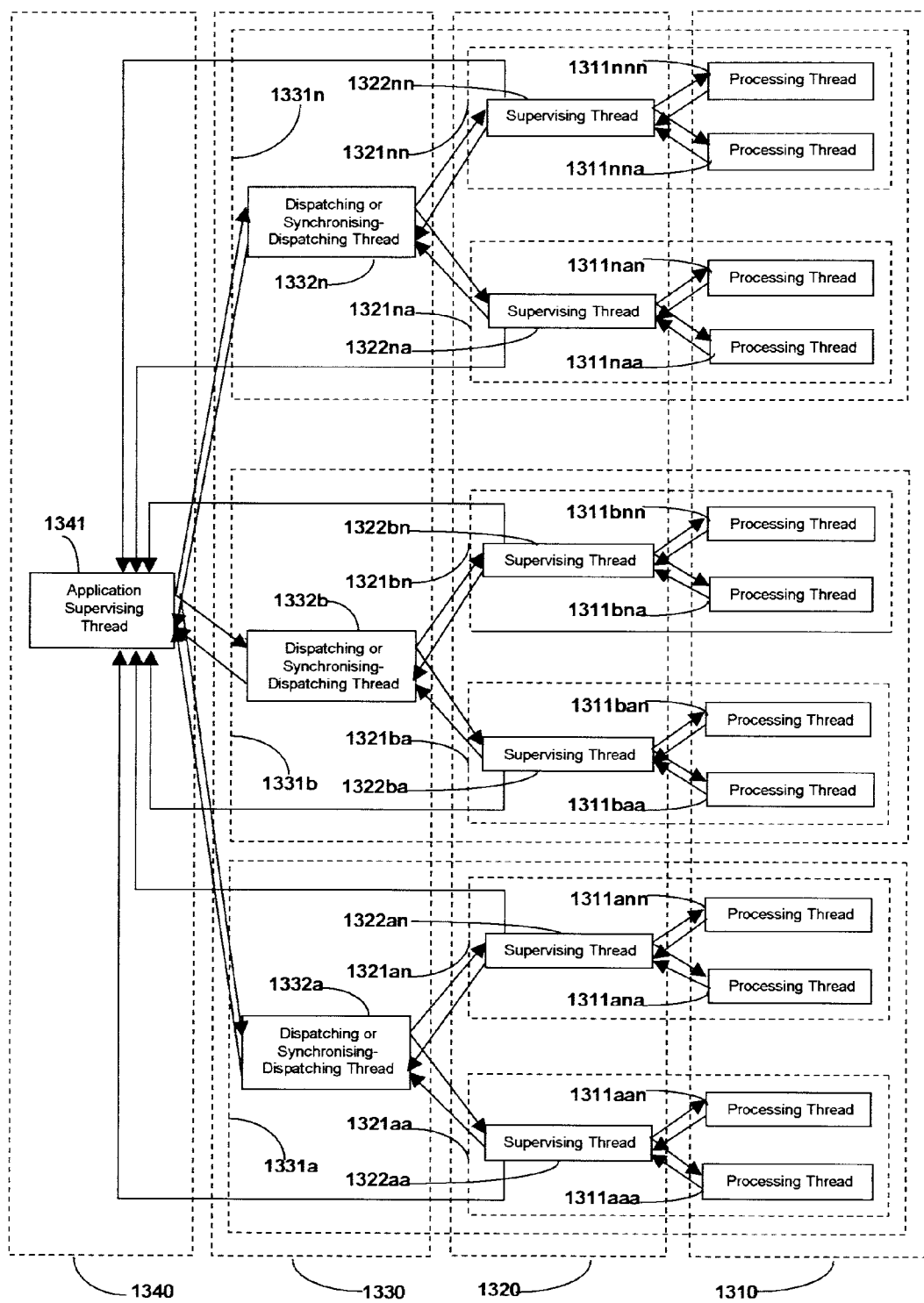
FIG. 13 is block diagram of hierarchical structure of threads with capacity for concurrent processing of multitude of workflow requests.

FIG. 13 is block diagram of hierarchical structure of threads. The entire set of created and activated processing threads forms hierarchy's First level 1310. Threads forming First level of hierarchical structure are directly responsible for transactional processing of requests for work and for transactional flow of control between workflow-activities. The entire set of created and activated supervising threads forms hierarchy's Second level 1320. Threads forming Second level of hierarchical structure are responsible for assignment of requests to individual processing threads and supervision of requests' execution. All dispatching or synchronizing-dispatching threads created and activated according to number of workload-dispatching objects in hierarchical tree of class objects and number of optional workflow-synchronizing objects in hierarchical tree of class objects forms hierarchy's Third level 1330. Dispatching threads being part of Third level are responsible for dispatching of requests to supervising threads. Synchronizing-dispatching threads being part of Third level are responsible for synchronization of execution of parallel control flows and for dispatching of requests to supervising threads. Fourth level 1340 is hierarchy's top level and comprises only one Application Supervising thread being responsible for making, executing and supervising decisions about allocation and de-allocation of system resources based on its own assessment. Allocation and de-allocation takes form of modification of First and Second levels of hierarchical structure of threads and their corresponding objects and collections of hierarchical tree of class objects.

Threads of First, Second, and Third levels are horizontally separated into divisions. Block diagram of FIG. 13 comprises three divisions 1331a, 1331b, and 1331n. Threads of a division belong to a particular workflow-activity. Therefore, number of thread structure's divisions is equal to number of workflow-activities in a workflow-process. Each division has one Dispatching or Synchronizing-Dispatching thread and two or more workload processors. For example, division 1331a comprises Dispatching or Synchronizing-Dispatching thread 1332a and workload-processors 1321aa and 1321an. Each workload-processor has one Supervising thread and a pool of processing threads. For example, workload-processor 1321aa comprises Supervising thread 1322aa and its private pool of treads containing threads 1311aaa and 1311aan.

Figure 14:
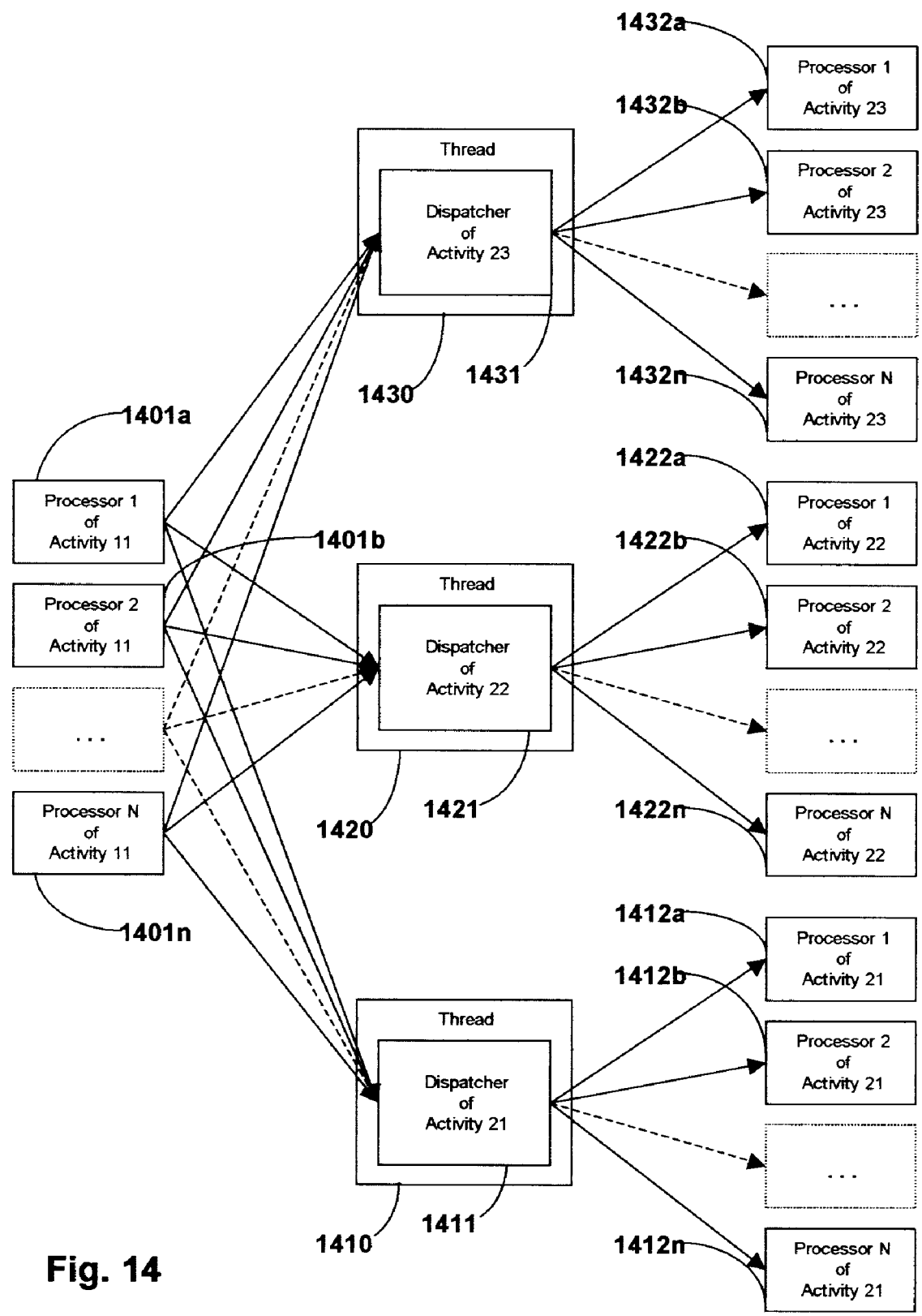
FIG. 14 is block diagram of splitting of flow of control in sample flow-graph of FIG. 3 after successful execution of workflow-activity A11 leading to establishing of three parallel control flows.

FIG. 14 is block diagram of splitting of flow of control in sample flow-graph of FIG. 3 after successful execution of activity A11 leading to establishing of three parallel control flows. Workload-dispatching objects 1032 of FIG. 10 contain all necessary data and functionality to create threads 1410, 1420, and 1430 and instantiate workload-dispatchers

1411, 1421, and 1431. As it is shown on the block diagram of FIG. 14, workload-dispatchers 1411, 1421, and 1431 are instantiated respectively in individual dispatching threads 1410, 1420, and 1430. All workload-processors 1401, after having a successful execution of activity A11 functionality, send a message signaling the event of successful execution of activity A11 functionality to workload-dispatcher 1411 belonging to activity A21, to workload-dispatcher 1421 belonging to activity A22, and to workload-dispatcher 1431 belonging to activity A23. Messages signaling a successful execution of activity A11 functionality are at the same time requests for execution of functionality respectively of activities A21, A22, and A23. Incoming requests to workload-dispatcher 1411 of activity A21 are dispatched according to workload balancing scheme to workload-processors 1412 of activity A21. Incoming requests to workload-dispatcher 1421 of activity A22 are dispatched according to workload balancing scheme to workload-processors 1422 of activity A22. Incoming requests to workload-dispatcher 1431 of activity A23 are dispatched according to workload balancing scheme to workload-processors 1432 of activity A23.

Figure 15:
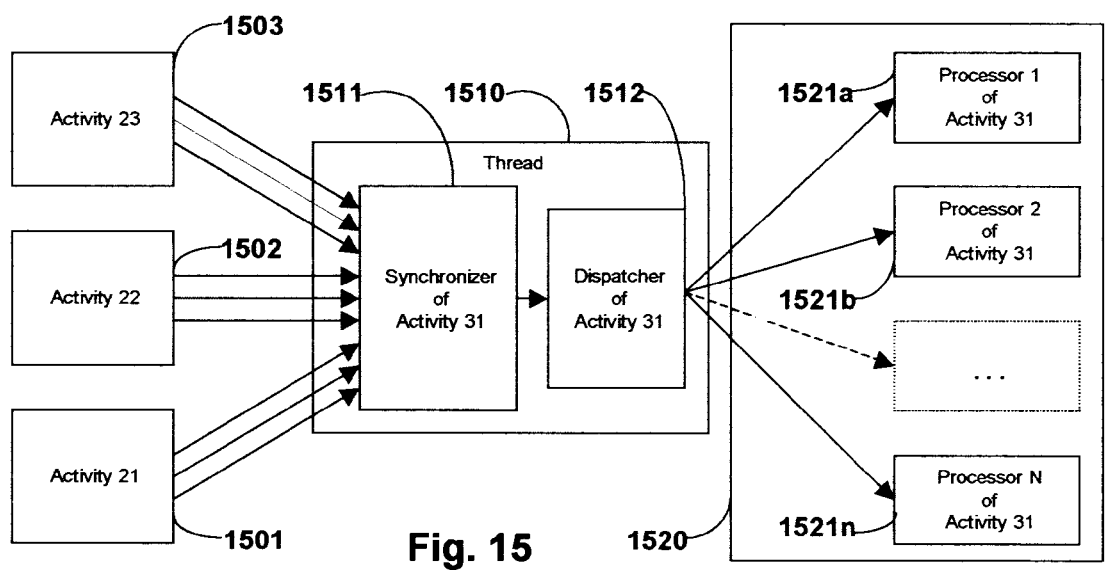
FIG. 15 is block diagram of synchronization of concurrent execution of three workflow-activities of sample flow-graph of FIG. 3 before execution of workflow-activity A31.

FIG. 15 is block diagram of synchronization of concurrent execution of three workflow-activities of sample flow-graph of FIG. 3 before execution of workflow-activity A31. Workload-dispatching object 1032 and workflow-synchronizing object 1031 of FIG. 15 contain all necessary data and functionality to create thread 1510 and instantiate workflow-synchronizer 1511 and workload-dispatcher 1512. Workflow-synchronizer 1511 and workload-dispatcher 1512 are instantiated in thread 1510. Successful executions of workflow-activity A21, of workflow-activity A22, and of workflow-activity A23 are signaled to workflow-synchronizer 1511. However, only successful executions of all three workflow-activities A21, A22, and A23 related to a particular workflow request will trigger forwarding the request to workflow-activity of the next workflow step, which is workflow-activity A32 presented as 1520. Forwarding will happen by signaling the workload-dispatcher 1512. Workload-dispatcher 1512 will then assign the forwarded request to a workload-processor 1521 of workflow-activity 1520 according to workload balancing scheme.

Figure 16:
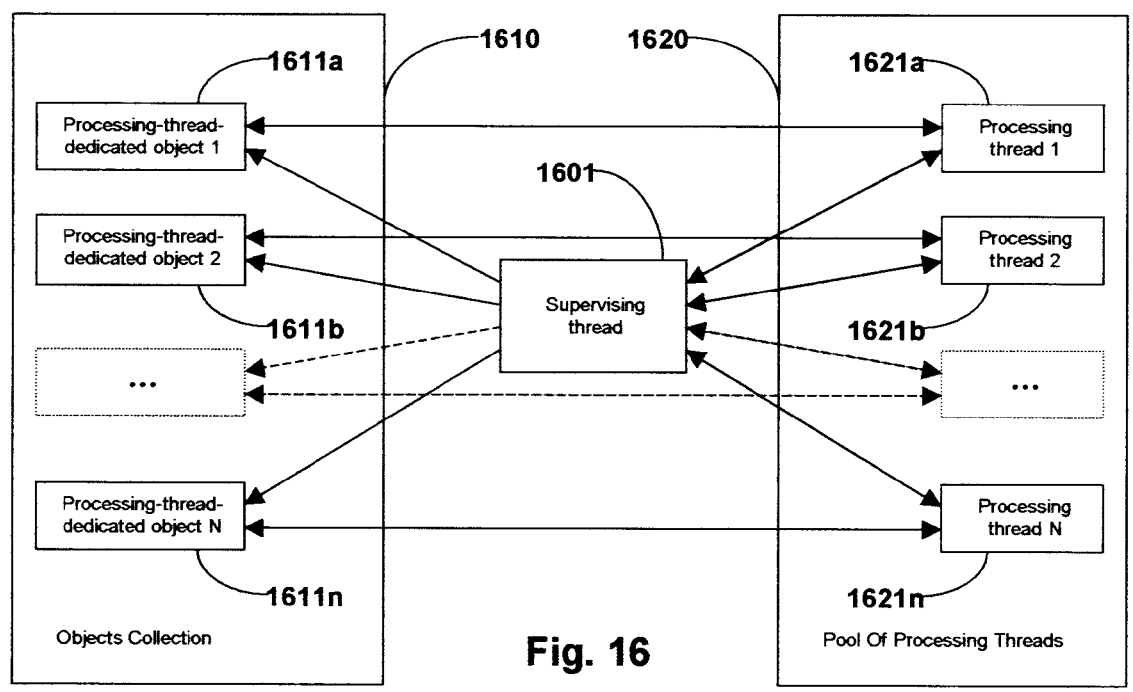
FIG. 16 is block diagram of interaction between supervising thread and processing threads involving processing-thread-dedicated objects.

FIG. 16 is block diagram of interaction between supervising thread and processing threads involving processing-thread-dedicated objects. On FIG. 10 every processing-thread-dedicated object 1042 belonging to collection 1041 is dedicated to a thread of private pool of processing threads belonging to workload-processor object 1034 being parent to collection 1041. On FIG. 16 every processing-thread-dedicated object 1611 belonging to collection 1610 is dedicated to a processing thread 1621 belonging to the pool of processing threads 1620 belonging to workload-processor object being parent to collection 1610. Supervising thread 1601 is responsible for accepting incoming to workload-processor requests for work, for assigning a request to a processing thread 1621 and for supervision of request execution. After a request is accepted, supervising thread 1601 selects a processing thread with an idle status. Next, it writes the entire specific to that request data to the processing-thread-dedicated object 1611 dedicated to selected thread and signals the selected thread that there is an assignment for it waiting to be processed. The selected processing thread 1621, after being signaled, reads the necessary data from its dedicated object 1611 and starts processing the request. After the request has been processed, the processing thread 1621 writes the execution result data to its dedicated object 1611 and signals the supervising thread 1601 that assigned request has been executed successfully or unsuccessfully. In case of unsuccessful execution, supervising thread 1601 will read the provided by processing thread 1621 data from dedicated object 1611. In case of successful execution no data reading necessarily takes place.

Figure 17:
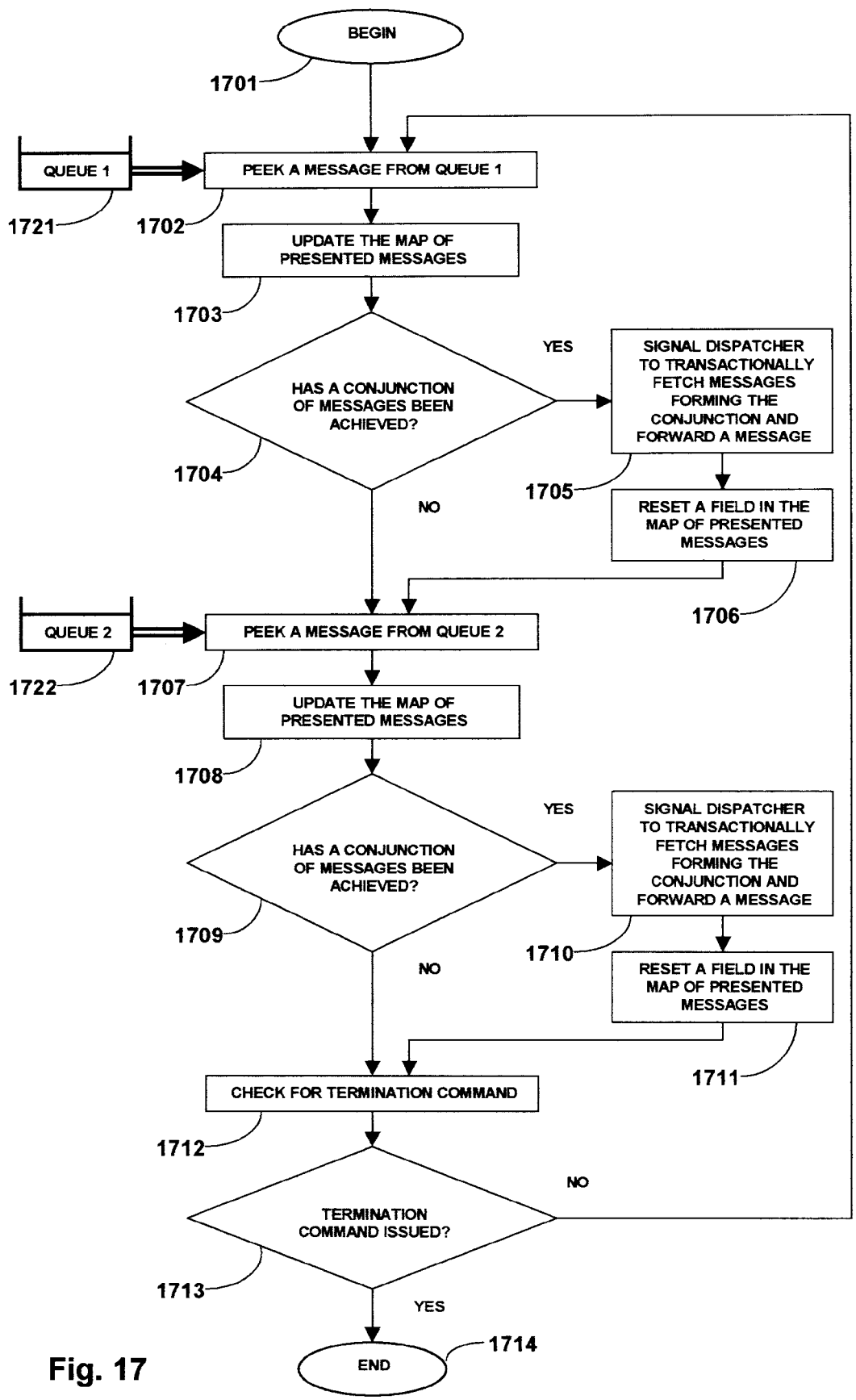
FIG. 17 is flowchart showing preferred steps of synchronization of two concurrently executed workflow-activities.

FIG. 17 is flowchart showing preferred steps of synchronization of two concurrently executed workflow-activities. The first performed step 1702 peeks a message from Queue1 1721. Next, step 1703 updates the map of presented messages. This map registers existence of messages being presented in queues, so when a new message is detected in a queue, a conjunction test, checking whether all messages necessary for triggering further processing of a request are presented, can be conducted with no further queue readings. Step 1704 is a conjunction test. If test result indicates achieved conjunction, procedure 1705 is executed to signal workload-dispatcher to transactionally fetch messages forming the conjunction and transactionally forward new message in direction selected according to workload balancing scheme. Step 1706 resets a field in the map of presented messages related to already fetched messages. Next executed step 1707 is executed as well when conjunction test 1704 indicates absence of a conjunction. Step 1707 peeks a message from Queue2 1722. Step 1708 updates the map of presented messages. Following step 1709 is a conjunction test. If test result indicates achieved conjunction, procedure 1710 is executed to signal workload-dispatcher to transactionally fetch messages forming the conjunction and transactionally forward new message in direction selected according to workload balancing scheme. Step 1711 resets a field in the map of presented messages related to already fetched messages. Next executed step 1712 is executed as well when conjunction test 1709 indicates absence of a conjunction. Step 1712 checks whether a termination command has been issued via termination event. If the command has been issued, the synchronization functionality terminates. Otherwise, performance continues with step 1702.

Figure 18:
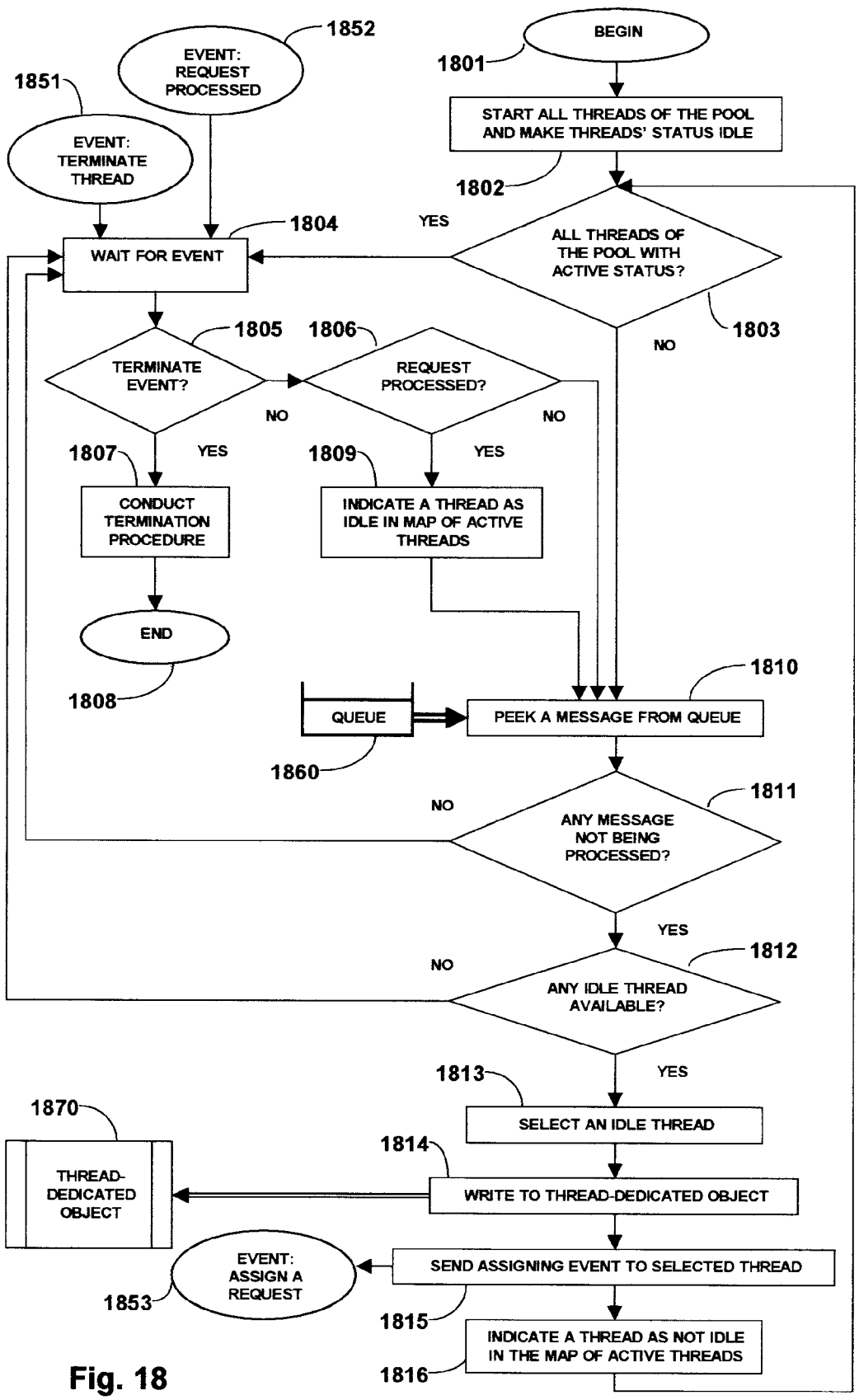
FIG. 18 is flowchart showing preferred steps performed by a supervising thread.

FIG. 18 is flowchart showing preferred steps performed by a supervising thread. First performed step 1802 is thread initialization. Before initialization, all processing threads of private pool of the workload-processor, where the supervising thread belongs, are in suspended state. During initialization the supervising thread activates all processing threads of the workload-processor's pool and makes started threads' state IDLE. Next, execution gets into thread's main loop and makes test 1803 checking whether all processing threads are with state ACTIVE. If the result is NO, next performed step is 1810 peeking for a message in supervising thread's queue 1860. Next performed step is test 1811 revealing whether a non-processed message has been detected. If YES, next performed is test 1812 checking for availability of a processing thread with IDLE state. If YES, step 1813 selects a processing thread with IDLE state. Next, step 1814 writes the available request-related data to processing-thread-dedicated object dedicated to the selected processing thread. Step 1815 fires an assigning event to selected thread, followed by step 1816 indicating the selected thread is no more with IDLE state in the map of active threads, followed by execution again of test 1803. If the result of test 1803, checking whether all processing threads are with state ACTIVE, is YES, next performed step is 1804. Step 1804 is the next performed step in two other occasions after test 1811, revealing whether a non-processed message has been detected, gives result NO and after test 1812, checking for availability of a processing thread with IDLE state, gives result NO. At step 1804 the thread does nothing it even does not consume processor time, just waits to be signaled that either event 1851, to terminate the thread, or event 1852, indicating that a request has been processed successfully or unsuccessfully, has been fired. Next test 1805 checks whether the event indicates that a thread termination command has been issued. If YES, next step 1807 is to conduct the entire set of actions related to thread terminating, not presented here for sake of simplicity. If the result is NO, next performed step is test 1806 checking whether the event signals that a request has been processed successfully or unsuccessfully. If YES, next step 1809 indicates in the map of active processing threads that the processing thread firing that event is with IDLE state and the following step is 1810, peeking for a message in supervising thread's queue 1860. Test 1806 should never, during normal conditions, give a result NO, but if the result is NO, the next performed step, after analyzing reasons for that result, will be 1810.

Figure 19:
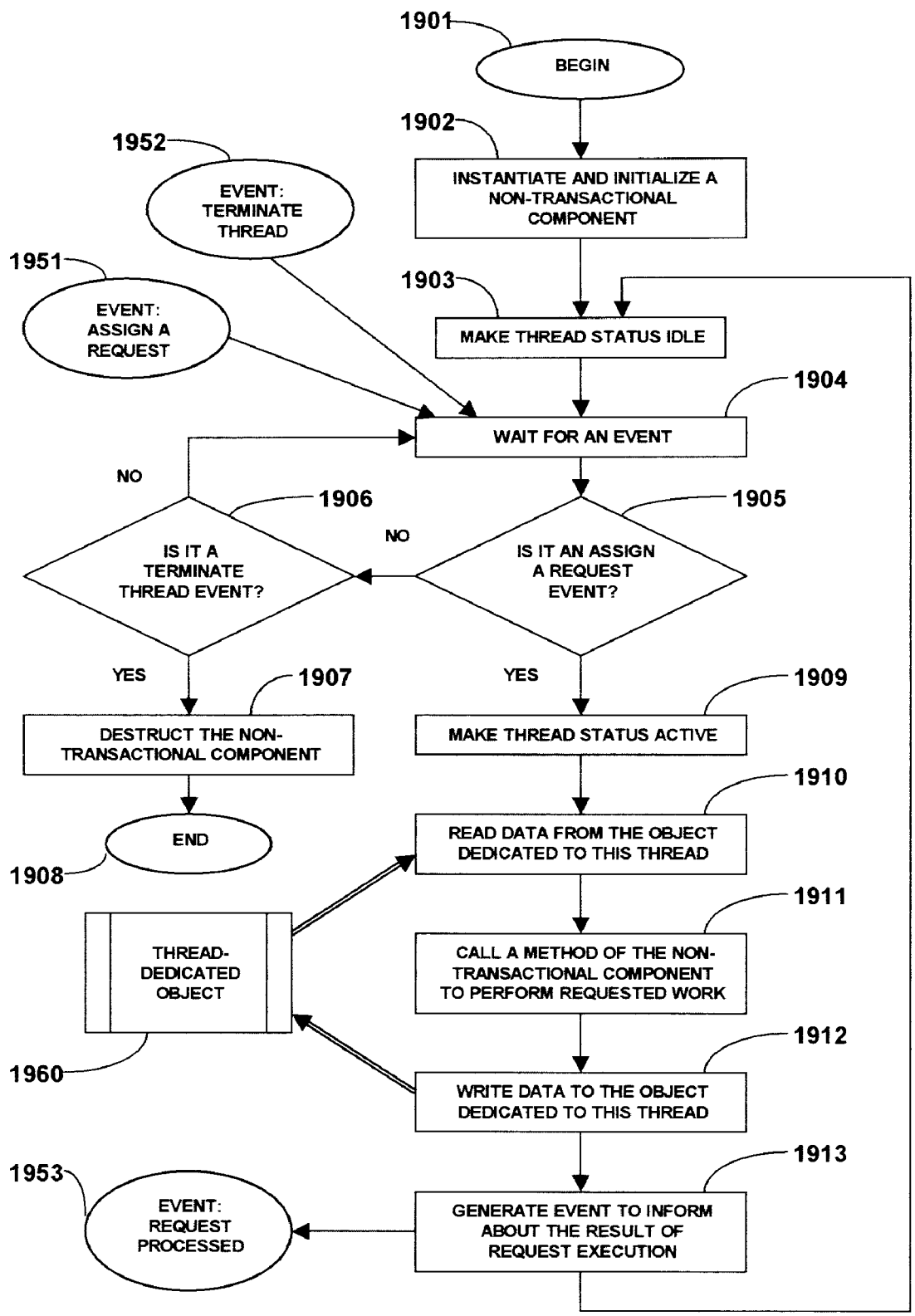
FIG. 19 is flowchart showing preferred steps performed by a processing thread.

FIG. 19 is flowchart showing preferred steps performed by a processing thread. First performed step 1902 is thread initialization. During its initialization, thread instantiates and initializes one Non-Transactional component, whose functionality will be individually explained later. Next performed step 1903 changes thread state as IDLE. By performing step 1903, the thread gets into its main loop where the next step is 1904. At step 1904, the thread does nothing it even does not consume processor time, just waits to be signaled that either event 1951, assigning a request, or event 1952, to terminate the thread, has been fired. Next, step 1905 checks whether the signaled event is for assigning a request. If the result is NO, next performed step is 1906 checking whether the signaled event is a command for thread termination. If YES, next step 1907 destructs the Non-Transactional component and terminates the thread. Test 1906 should never during normal conditions give a result NO, but if the result is NO, the next performed step, after analyzing reasons for that result, will be again 1904. If the result of step 1905, checking whether the signaled event is for assigning a request, is YES, next step 1909 changes the thread state as ACTIVE. Next, step 1910 reads from its processing-thread-dedicated object 1960 the data necessary to perform required work related to assigned request. Next, step 1911 calls a method of the Non-Transactional component, thereby starting transactional execution of functionality of the workflow-activity served by the workflow-processor to whose pool of processing threads this thread belongs. After the call of the method of the Non-Transactional component returns, it might feed back some information regarding the execution of workflow-activity functionality. At the next step 1912, this feedback data is saved in the processing-thread-dedicated object 1960, followed by step 1913, firing an event 1953 to signal its supervising thread about the completion of assigned request for work. Next step is to perform again step 1903 that changes thread state as IDLE followed by step 1904 waiting to be signaled that either event 1951 or event 1952 has been fired.

Invention further includes a method for transactional plugging of software components into workflow-process. The preferred embodiment of this method uses services of COM+. It involves a Non-Transactional component and a Transactional component installed on a physical computer as a COM+ application and software components that will be plugged into workflow process, installed on the same physical computer as a COM+ application. COM+ provides component-intercepting objects and functionality of just-in-time-activation for the Transactional component and for software components that will be plugged into workflow process. The just-in-time-activation functionality ensures that when a method of a component intercepting object is called, it will instantiate transactional object, call its method, vote for transaction on method exit, and destruct the transactional object. The Non-transactional component is a special kind of data holding component. The data it holds is required for execution of all future request-processing and request-forwarding transactions that will be performed by the processing thread. This data however is not specific or distinctive to any particular request. The main reason for existence of the non-transactional component is to prevent the processing thread from multiple transmissions of the mentioned, non-specific to any particular request, data over COM+ application process boundaries and multiple creations of the intercepting objects.

Figure 20:
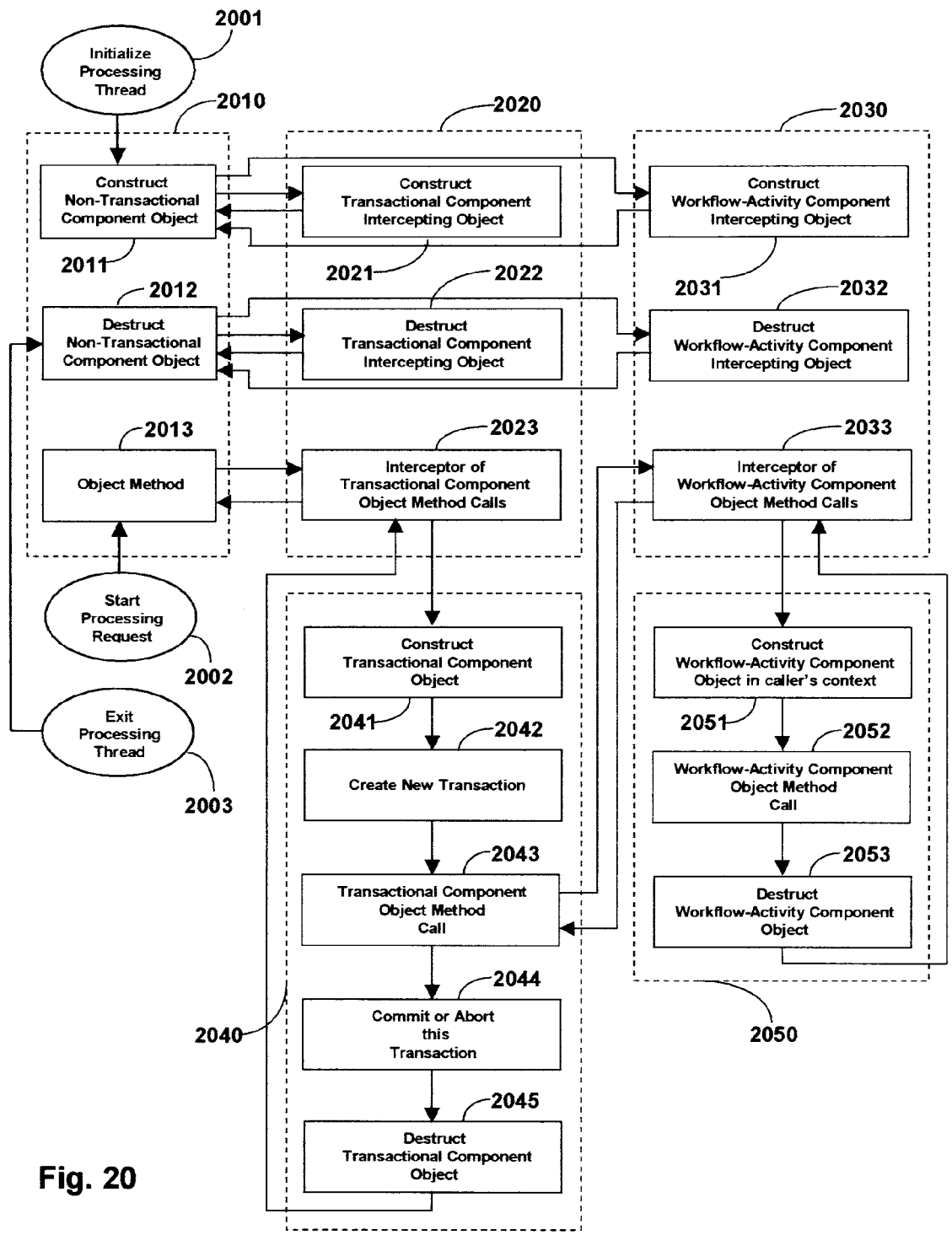
FIG. 20 is block diagram showing steps in transactional plugging of software components into workflow-process.

FIG. 20 is block diagram showing steps in transactional plugging of software components into workflow-process. During initialization of a processing thread 2001, a non-transactional component object 2010 is instantiated. Block 2011 represents construction and initialization of the non-transactional component object 2010. Initializing method makes an attempt to construct a transactional component object 2040 with a COM class named on the diagram as Transactional Component and to construct a transactional component object 2050 with COM class being a workflow-activity component, whose GUID (Globally Unique Identifier) was sent to the non-transactional component object 2010 as initialization parameter. Both construction attempts however will be intercepted by COM+ functionality. Attempt to constructor 2040 will behind the scene result in call to constructor 2021 and construction of Transactional Component-intercepting object 2020. Returned pointer, even though appearing as pointer to the Transactional component, points to the component-intercepting object. Attempt to construct 2050 will behind the scene result in call to constructor 2031 and construction of Workflow-Activity Component-intercepting object 2030. Returned pointer, even though appearing as pointer to the Workflow-Activity component, points to the component-intercepting object.

When a supervising thread receives a workflow request, it assigns processing of request to a processing thread of its pool. The processing thread starts request-processing 2002 on FIG. 20 by calling a method 2013 of its non-transactional component object. Object method 2013 makes a call to method 2023 of the Transactional Component-Interceptor object. This method calls constructor 2041 resulting in construction of object 2040 and creation of a new transaction 2042, and calls Transactional Component Object method 2043. Method 2043 calls method 2033 of the Workflow-Activity Component-Interceptor object. Method 2033 constructs Workflow-Activity Component object 2050 within the caller's context, therefore within the context of transaction created at 2042, makes a call to method 2052 and on method exit destructs at 2053 object 2050 immediately before 2033 returns to 2043. Completed execution of 2043 is followed by block 2044 committing or aborting the transaction created at 2042 and by block 2045 destructing object 2040 immediately before method 2023 returns to 2013. When processing thread receives a notification 2003 to terminate, it destructs at 2012 the non-transactional component object. Destructor 2012 calls destructors 2022 and 2032 to destructs respectively objects 2020 and 2030.

Figure 21:
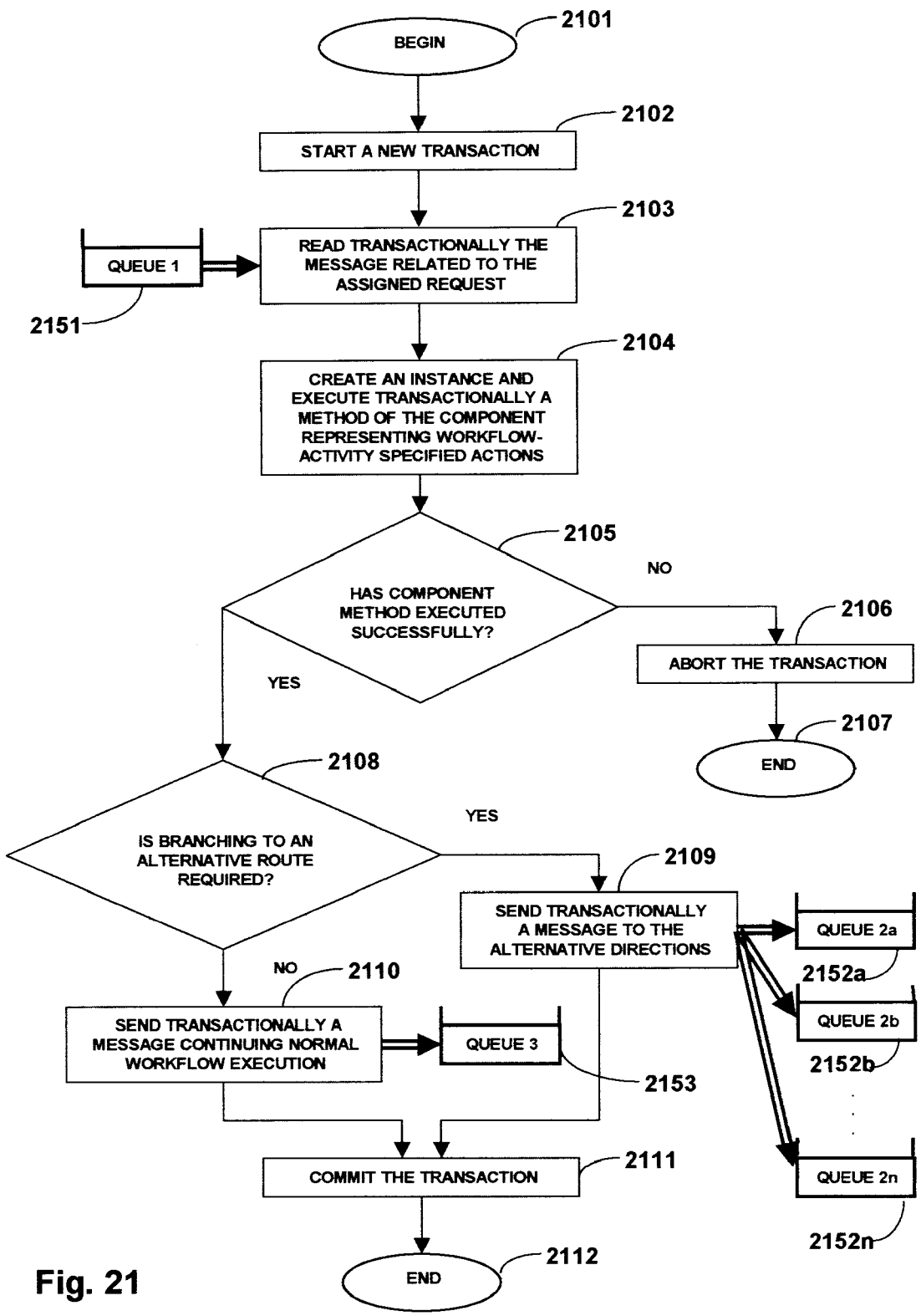
FIG. 21 is flowchart showing preferred steps performed by transactional component method.

FIG. 21 is flowchart showing preferred steps performed by transactional component method. According to the flowchart, the first performed step 2102 starts a new transaction. Transactional component, however, does not have to perform step 2102 if the transactional environment, being informed that execution of a method of this component requires a new transaction, starts a new transaction. Next step 2103 reads transactionally the message related to assigned request from Queue1 2151. Next, step 2104 creates an instance of component representing workflow-activity specified actions and calls a component method. Next, step 2105 checks whether component method has been executed successfully. If the result is NO, next performed step is 2106 aborting the entire transaction followed by step 2107 for Transactional component method to return. If the result is YES, next performed step is 2108 to check whether the result of execution of workflow-activity component method indicates a requirement to branch from the normal workflow execution. If the result is YES, next performed step is 2109 sending transactionally branching control and/or notification messages to Queue2*a* 2152*a*, to Queue2*b* 2152*b*, and to Queue2*n* 2152*n*, followed by step 2111 to commit the transaction and step 2112 to return. If the result is NO, next performed step is 2110 sending transactionally a message to Queue3 2153 to continue the normal workflow execution, followed by step 2111 to commit the transaction and step 2112 to return.

The capacity for concurrent processing of multitude of workflow requests of identical type is achieved by the hierarchical structure of threads with four levels and by division of labor between threads of hierarchical structure levels. Upper level of workload balancing comprises multitude of associations between a dispatching thread and multitude of supervising threads and involves dispatching thread, balancing workload between its associated supervising threads. Lower level of said workload balancing comprises multiple groupings of processing threads in pools associated with a supervising thread per pool and involves supervising threads balancing workload between processing threads of their associated pools. The rationale behind workload balancing with two levels is the need to distrbute the work, related to assignment of workload processing thread and supervision of workload execution, between more thread and thereby to prevent thread responsive for this work from becoming workload bottlenecks.

Figure 22:
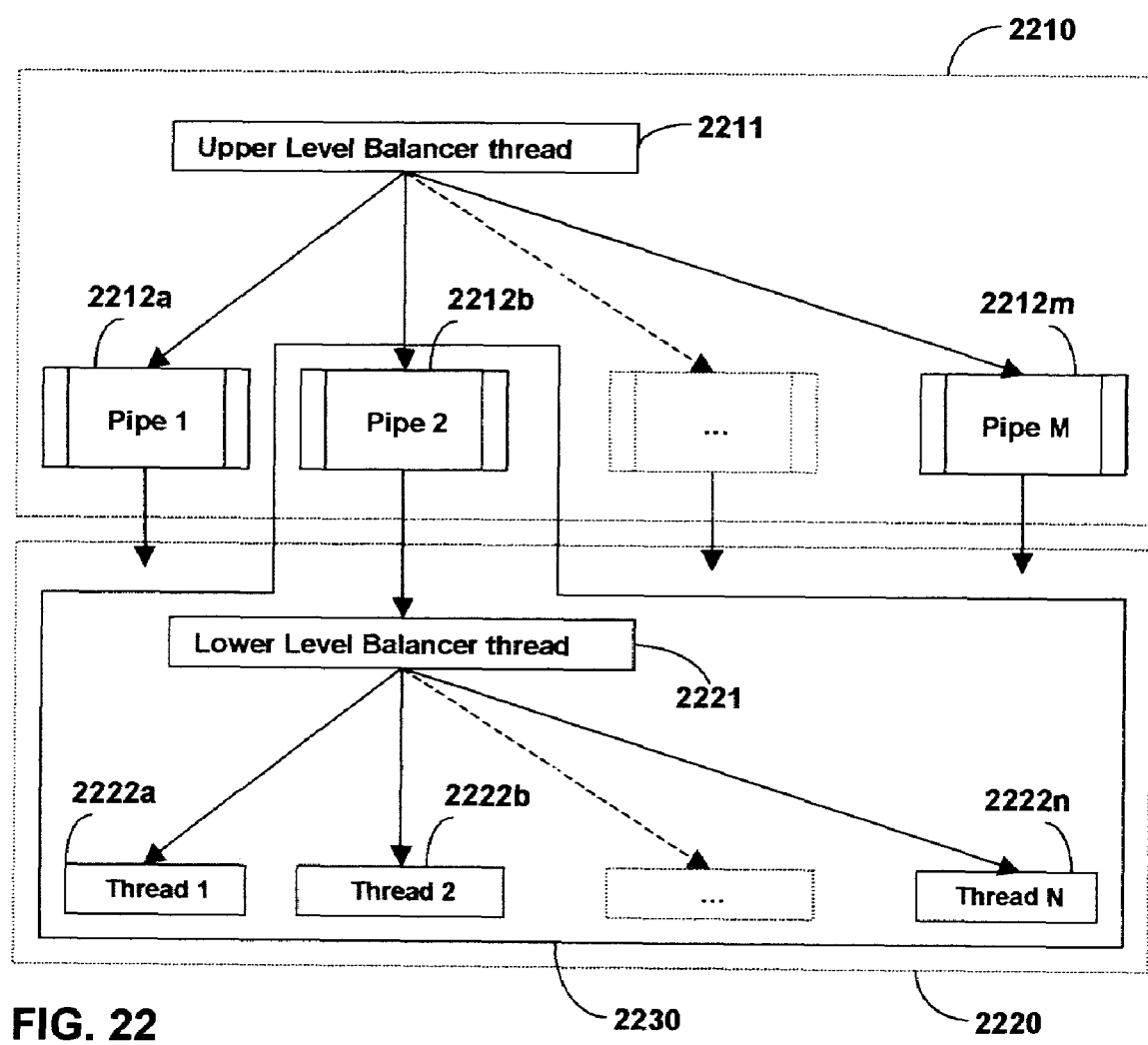
FIG. 22 is block diagram of balancing of workload incoming to a workflow-activity, structured in two levels.

Referring to FIG. 22, it can be seen that workload balancing is structured into hierarchy with two levels upper level 2210 and lower level 2220. Upper level 110 consists of an upper level balancer thread 2211 receiving incoming requests and dispatching incoming workload to number of processing pipe objects 2212 according to dispatching schedule. A processing pipe 2230 is abstract construction comprising processing pipe's object 2212 and associated to it lower level balancer thread 2221 and a pool of processing threads 2222. Projection of upper level balancing onto hierarchical structure of threads presented on FIG. 13 and hierarchical tree of objects presented on FIG. 10 reveals that upper level balancer thread 2211 is one of the dispatching or synchronizing-dispatching threads 1332 on FIG. 13 paired with one of dispatching objects 1032 on FIG. 10 and possibly with an object 1031 having the same parent 1022 as object 1032. A processing pipe object 2212 is one of objects 1034 on FIG. 10, belonging to collection 1033 that belongs to the same parent 1022 as object 1032 paired with the balancer thread 2211. A processing pipe object 2212 is one of workload-processors 1321 on FIG. 13, belonging to the same division 1331 associated to a workflow-activity where thread 1322, being balancer thread 2211 on FIG. 22, belongs.

Lower level 2220 consists of number of lower level balancer threads 2221 and number of pools containing multitudes of processing threads 2222. Number of balancer threads 2221 which is equal to number of pools 2222 is equal to number of processing pipe objects 2212 participating in upper level workload balancing. A lower level balancer thread responsibilities comprise: receiving of incoming requests; assigning units of work to idle threads prom pipe's pool; supervising execution of assigned work; and keeping track of active processing threads from pipe's pool. Projection of lower level balancing onto hierarchical structure of threads presented on FIG. 13 and hierarchical tree of objects presented on FIG. 10 reveals that lower level balancer thread 2221 is one of the supervising threads 1322 on FIG. 13 paired with one of objects 1034 on FIG. 10. A processing pipe is one of workload-processors 1321 on FIG. 13 paired with the same object 1034 on FIG. 10 as processing pipe's supervising thread. The pool of processing threads containing threads 2222 on FIG. 22 is paired with a collection object 1041 on FIG. 10. Threads 2222 on FIG. 22 are processing threads 1311 on FIG. 13 belonging to the same workload-processor 1321. Each thread 2222 has an associated processing-thread-dedicated object 1042 on FIG. 10 belonging to the same collection 1041 paired with the pool where threads 2222 belong.

This invention provides apparatus for software bottlenecks' prevention. Software bottlenecks' prevention involves encapsulation of a thread pool containing fixed number of processing threads with a supervising thread in a processingpipe. Number of processing threads per processingpipe is experimentally selected in a way ensuring that, without modifying threads' priorities, even if processing threads conduct fullscale dummy workflow work, processing-pipe's supervising thread will still have enough capacity to cope with its duties. Having number of processing thread fixed guarantees that supervising thread will never be overloaded with work leading to existence of workload dispatched to it and waiting to be processed and at the same time existence of number of IDLE processing threads in its pool.

Invention's adaptive high-performance capacity is based on apparatus for software bottlenecks neutralizing, involving detection of bottlenecks and bottlenecks counteraction by scaling up, and on apparatus for maintaining optimal workflow processing capacity available. Decisions for fighting bottlenecks and for regulation of available workflow processing capacity are made by application supervising thread 1342 on FIG. 13. Decision-making is based on information provided by supervising threads 1322 about intensity of working conditions in their respective processing-pipes 1321. Triggering of decisions execution is made by application supervising thread by sending commands to dispatching or synchronizing-dispatching threads 1332 at level 1330. Supervision of decisions execution is conducted by application supervising thread by receiving and analyzing reports provided by threads of level 1330.

Software bottlenecks' neutralizing comprises construction of additional processing-pipes and inclusion of constructed additional processing-pipes in workload balancing process related to workflow-activity where development of bottleneck has been detected. Regulation of available workflow processing capacity includes apparatus for automatic detection of conditions requiring workflow application scaling up and for automatic execution of workflow application scaling up. The automatic detection in regard to a particular workflow-activity involves checking for conjunction of events, from all processing-pipes associated to said workflow-activity, signaling that number of idle threads in processing-pipe's pool reached its critical minimum. Application scaling up is automatically triggered at a particular workflow-activity to counteract development of a bottleneck at that particular workflow-activity and automatically triggered at all application's workflow-activities for higher application responsiveness when workload increases. Application scaling up might require creation of an additional processing-pipe. In this case it cannot be automatically triggered. If there is an available non-activated processing pipe, automatically triggered scaling up involves activation of an additional processing-pipe and inclusion of said additional processing-pipe in workload balancing scheme.

Figure 23:
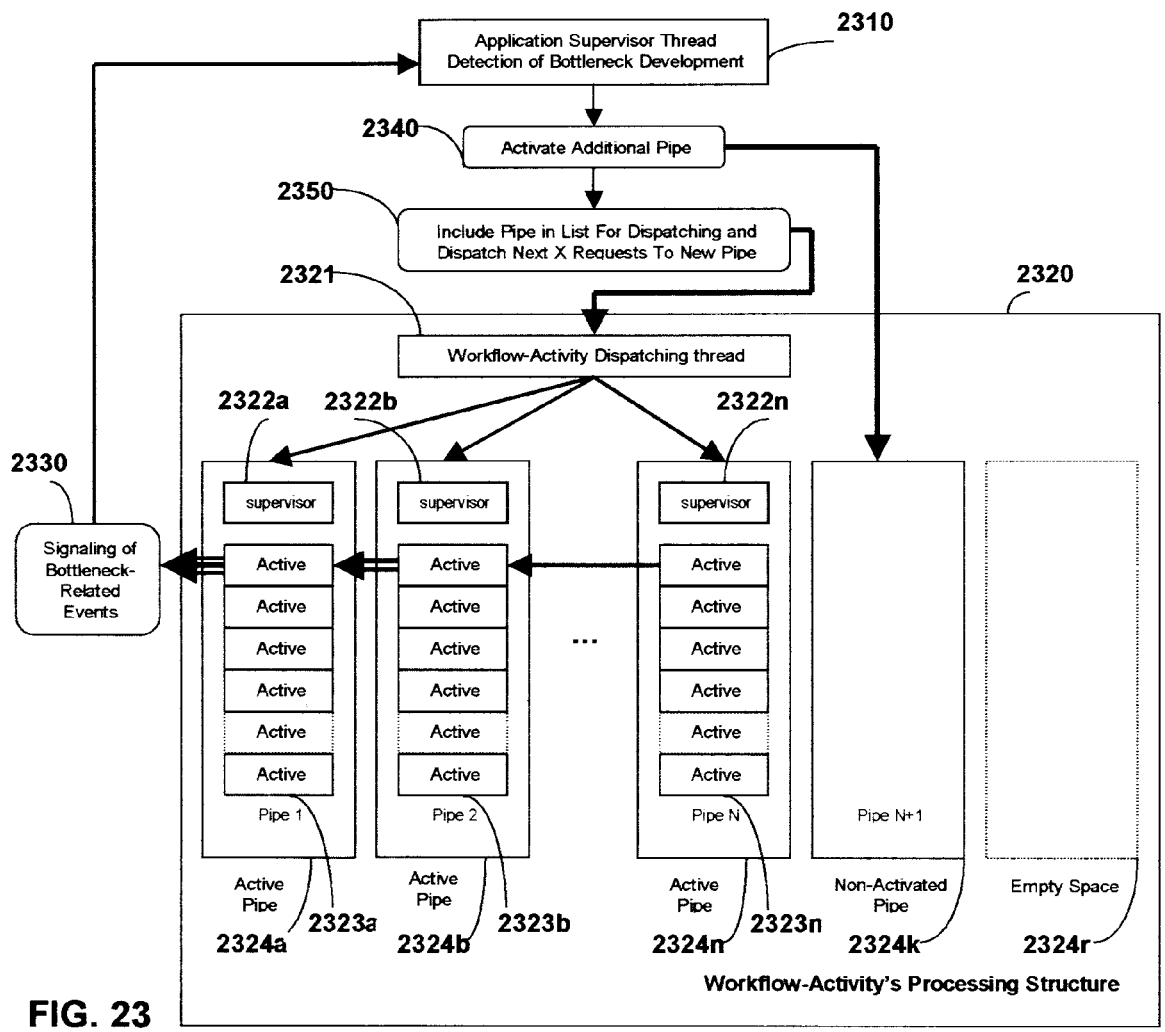
FIG. 23 is block diagram of workflow-activity processing structure, detection of bottleneck development, and scaling up its workflow-processing capacity.

FIG. 23 is block diagram of workflow-activity processing structure, detection of bottleneck development, and scaling up its workflow-processing capacity. Workflow-activity processing structure 2320 consists of a workflow-activity dispatching thread 2321, number of active pipes 2324a to 2324n, zero or more non-activated pipes 2324k, and zero or more empty spaces 2324r for construction of additional pipes. A non-activated pipe is a pipe object with no threads associated to it. Pipe activation involves creation and activation of pipe's supervising thread 2322 and plurality of processing threads forming pipe's pool 2323. Thread 2322 receives potentially dispatched to pipe 2324 requests, assigns units of work to processing threads with IDLE status from pipe's pool 2323 of processing threads, supervises execution of assigned work and keeps track of active processing threads. Block diagram's element 2330 is responsible for signaling of bottleneck-detection related events to application supervisor thread 2310, which conducts the necessary for detection of bottleneck development. Application supervisor thread 2310 is responsible for detection of early signs of bottleneck development and for triggering preventive actions. After detecting that a bottleneck development has started, application supervisor thread initiates and supervises activation 2340 of additional processing pipe. After 2340 is successfully completed, application supervisor thread executes 2350 to include activated pipe in list for dispatching and to dispatch next X requests to the new-activated pipe.

Figure 24:
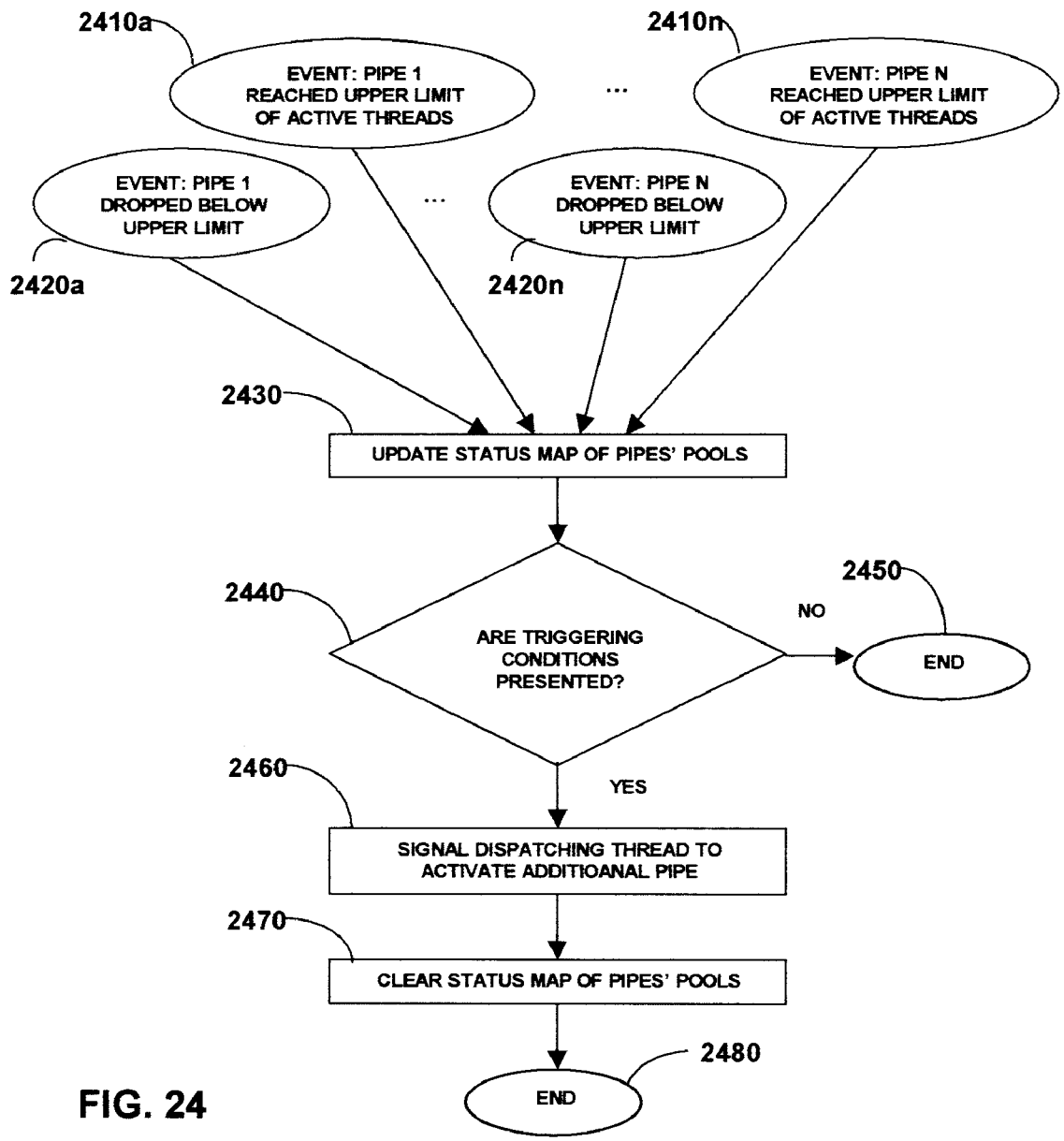
FIG. 24 is flowchart showing preferred steps performed by apparatus for detection of development of bottleneck.

FIG. 24 is flowchart showing preferred steps performed by apparatus for detection of development of bottleneck. Execution can be started by anyone of events 2410 generated when a pipe reaches its upper limit of active threads, or by anyone of events 2420 generated when pipe's number of active threads drops below upper limit. After starting, first performed step 2430 updates status map of pools of all active pipes 2323 on FIG. 23 belonging to workflow activity processing structure 2320. Next performed step 2440 checks for triggering conditions being presented. Execution started by an event 2420 inevitably returns NO during checking at step 2440 and ends by performing step 2450. Execution started by an event 2410 might lead to checking at step 2440 returning YES, followed by performing of step 2460 to signal application supervising thread to activate additional pipe and by performing of step 2470 to clear status map of pipes' pools.

Figure 25:
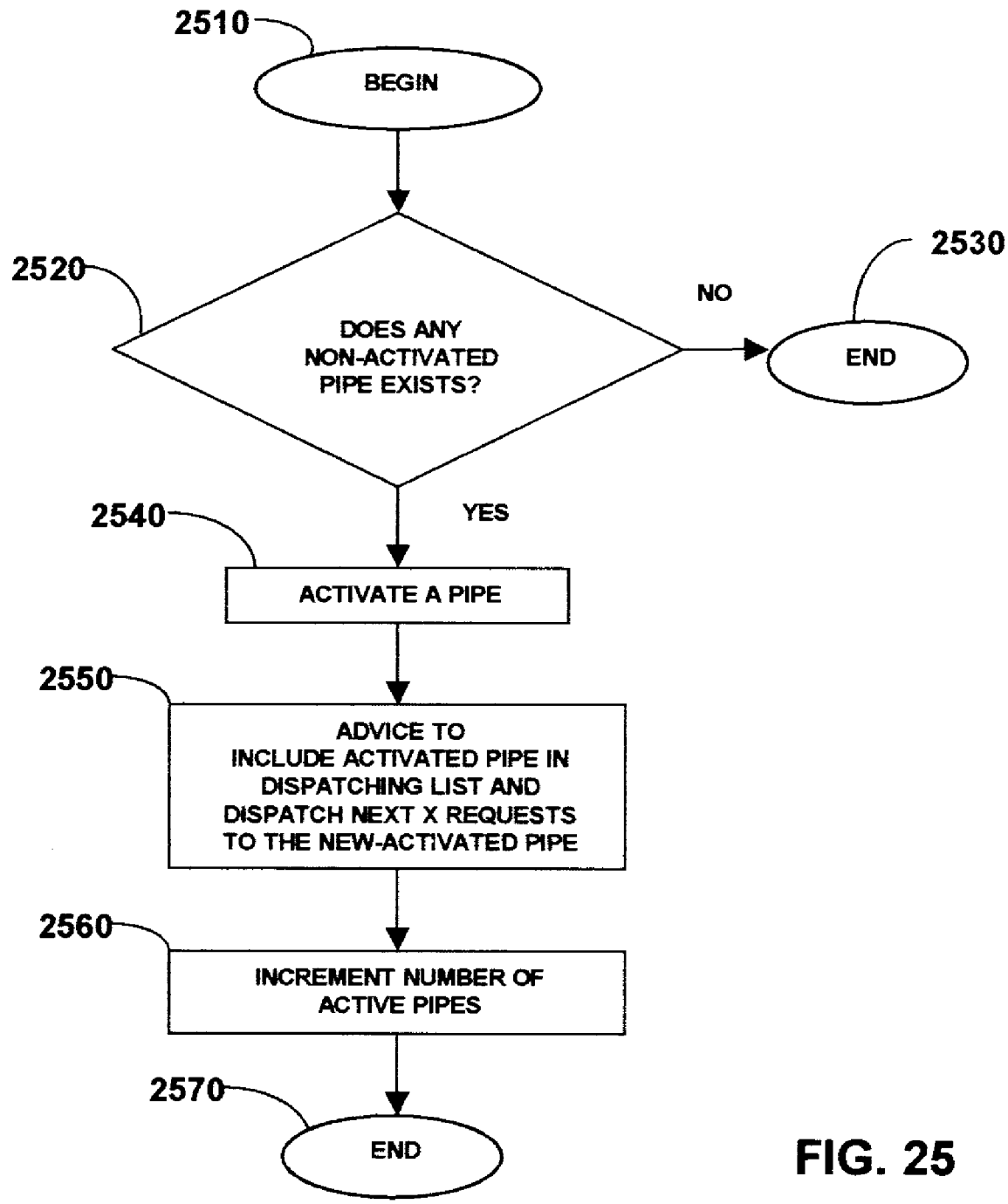
FIG. 25 is flowchart showing preferred steps performed by apparatus for scaling up processing capacity of a workflow-activity.

FIG. 25 is flowchart showing preferred steps performed by apparatus for scaling up processing capacity of a workflow-activity. First performed step 2520 checks whether any non-activated pipe exists. If a non-activated pipe does not exist, the prevention of development of bottleneck functionality cannot do anything before construction of a new processing pipe, so it ends by performing step 2530. If checking at 2520 confirms existence of a non-activated pipe, flowchart execution continues by performing step 2540 to activate the existing non-activated processing pipe. Next performed step is 2550 to send an advice to workflow-activity dispatching thread 2321 on FIG. 23 for inclusion of activated processing pipe in dispatching list. Workflow-activity dispatching thread, after inclusion of activated processing pipe in its dispatching list, dispatches next X requests to the new-activated processing pipe in order to make full utilization of its pool of processing threads. X is an integer number equivalent to permitted upper limit of active threads in a pipe minus a predefined integer constant.

Figure 26:
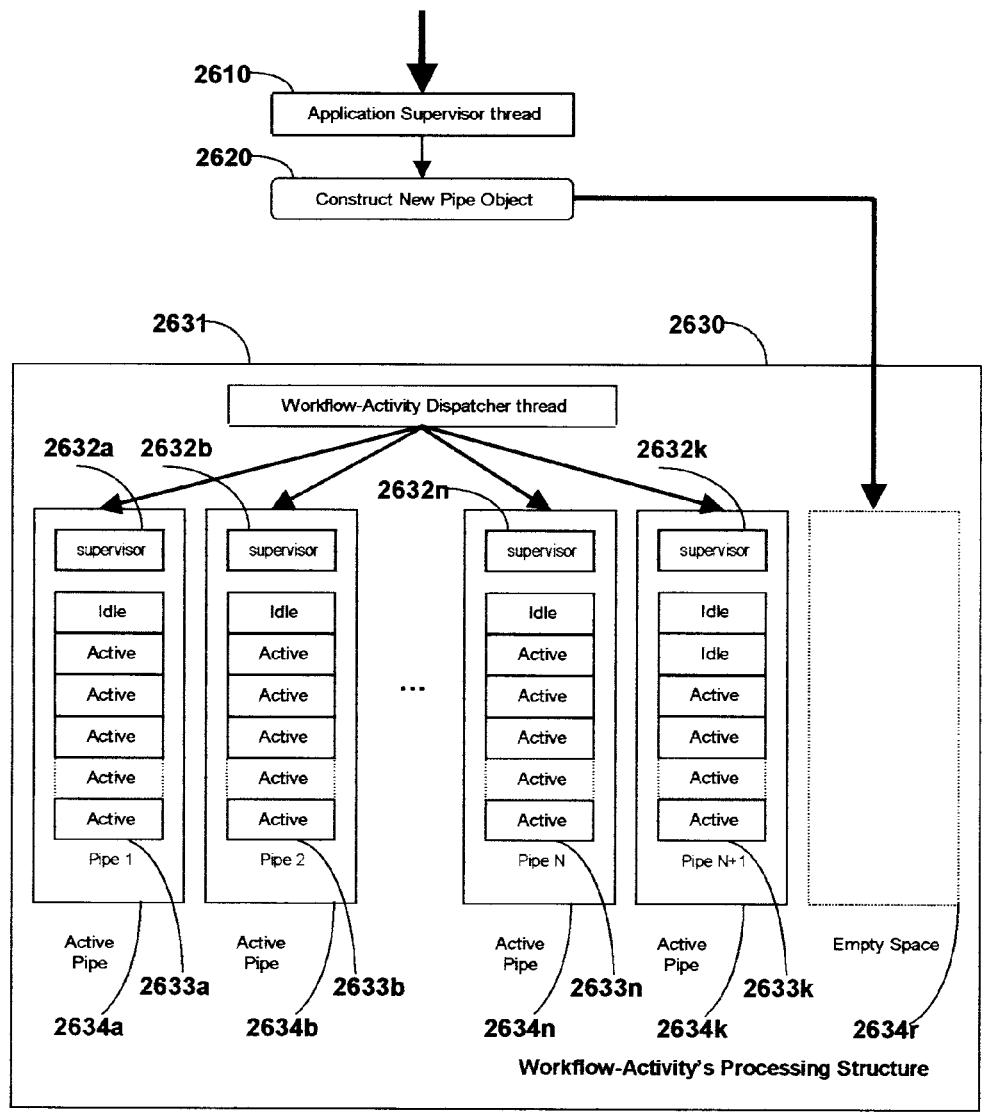
FIG. 26 is block diagram of workflow-activity processing structure and creation of additional processing pipe.

Extent of application ability for automatic scaling up is limited by number of existing processing pipes belonging to a workflow-activity. FIG. 26 is block diagram of workflow-activity processing structure and creation of additional processing pipe. Workflow-activity processing structure 2630 shows the additional processing pipe 2634k activated at step 2540 on FIG. 25, after processing pipe 2634k having X requests dispatched to it, causing the number of active processing threads in pools 2633a to 2633n belonging to pipes 2634a to 2534n to drop slightly. Creation of an additional pipe can be triggered only by request from application administrator. Application administrator should make such request based on observation that processing power of computer system hosting the workflow application is being significantly under-utilized and based on estimates of processing power required to other applications running on host computer system. Request for creation of a new pipe is signaled to application supervising thread 2610. After being signaled, application supervisor thread initiates and supervises creation of additional processing pipe at 2620, which is practically a construction of new processing pipe object. A processing pipe object is an object 1034 on FIG. 10, containing a collection 1041 containing plurality of objects 1042.

Figure 27:
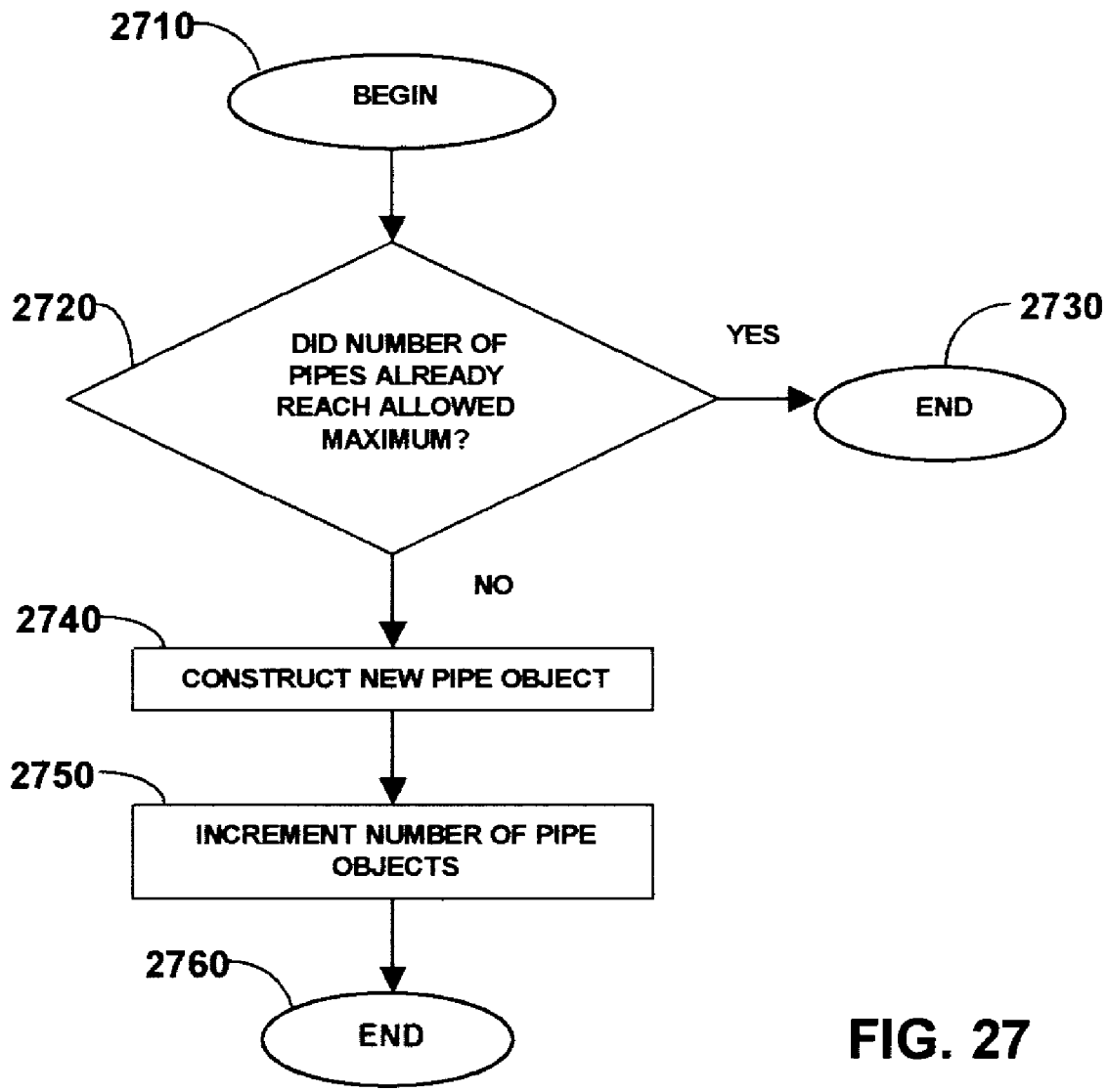
FIG. 27 is flowchart showing preferred steps performed by apparatus for creation of additional processing pipe.

FIG. 27 is flowchart showing preferred steps performed by apparatus for creation of additional processing pipe. First performed step 2720 checks whether number of pipes already reached the allowed maximum. If YES, the request for creation of a new pipe is ignored and the next performed step is 2730. If NO, a new pipe object is constructed by performing step 2740, and a workflow-activity counter representing number of its pipe objects is updated by performing step 2750.

Regulation of available workflow processing capacity further includes apparatus for automatic detection of conditions requiring workflow application scaling down and for automatic execution of workflow application scaling down. Automatic detection in regard to a particular workflow-activity involves checking for conjunction of events, from all processing-pipes associated to said workflow-activity, signaling that number of busy threads in processing-pipe's pool reached its critical minimum. Application scaling down is automatically triggered to counteract a detected inefficiency in use of system memory and CPU time slice allocated to application threads.

Figure 28:
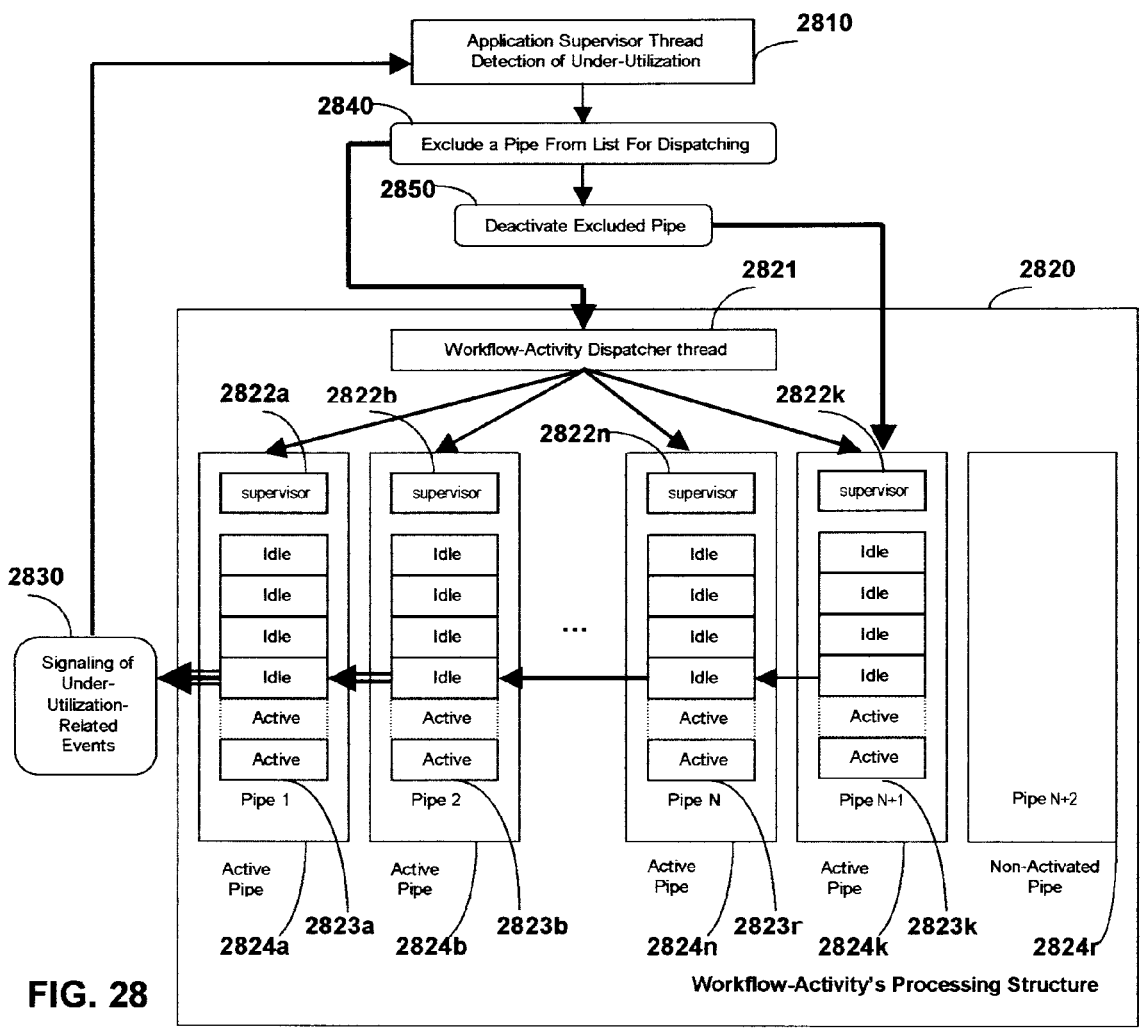
FIG. 28 is block diagram of workflow-activity processing structure, detection of threads under-utilization, and scaling down its workflow-processing capacity.

FIG. 28 is block diagram of workflow-activity processing structure, detection of threads under-utilization, and scaling down its workflow-processing capacity. Block diagram' s element 2830 signaling of under-utilization related events signals early signs of threads under-utilization to application supervising thread 2810 responsible for detection of conditions that must trigger prevention of further under-utilization of threads of processing-pipes belonging to a workflow-activity. After detection of triggering condition, application supervisor thread initiates exclusion 2840 of a processing-pipe from dispatching list by signaling workflow-activity dispatching thread 2821 and deactivation 2850 of excluded processing-pipe. After the exclusion 2840, workload dispatched to the rest of active processing-pipes increases, thereby reducing the total number of IDLE processing threads in pipes that will stay active. During the deactivation

2850, all threads belonging to deactivated processing-pipe are terminated and consumed by threads resources are returned back to system.

Figure 29:
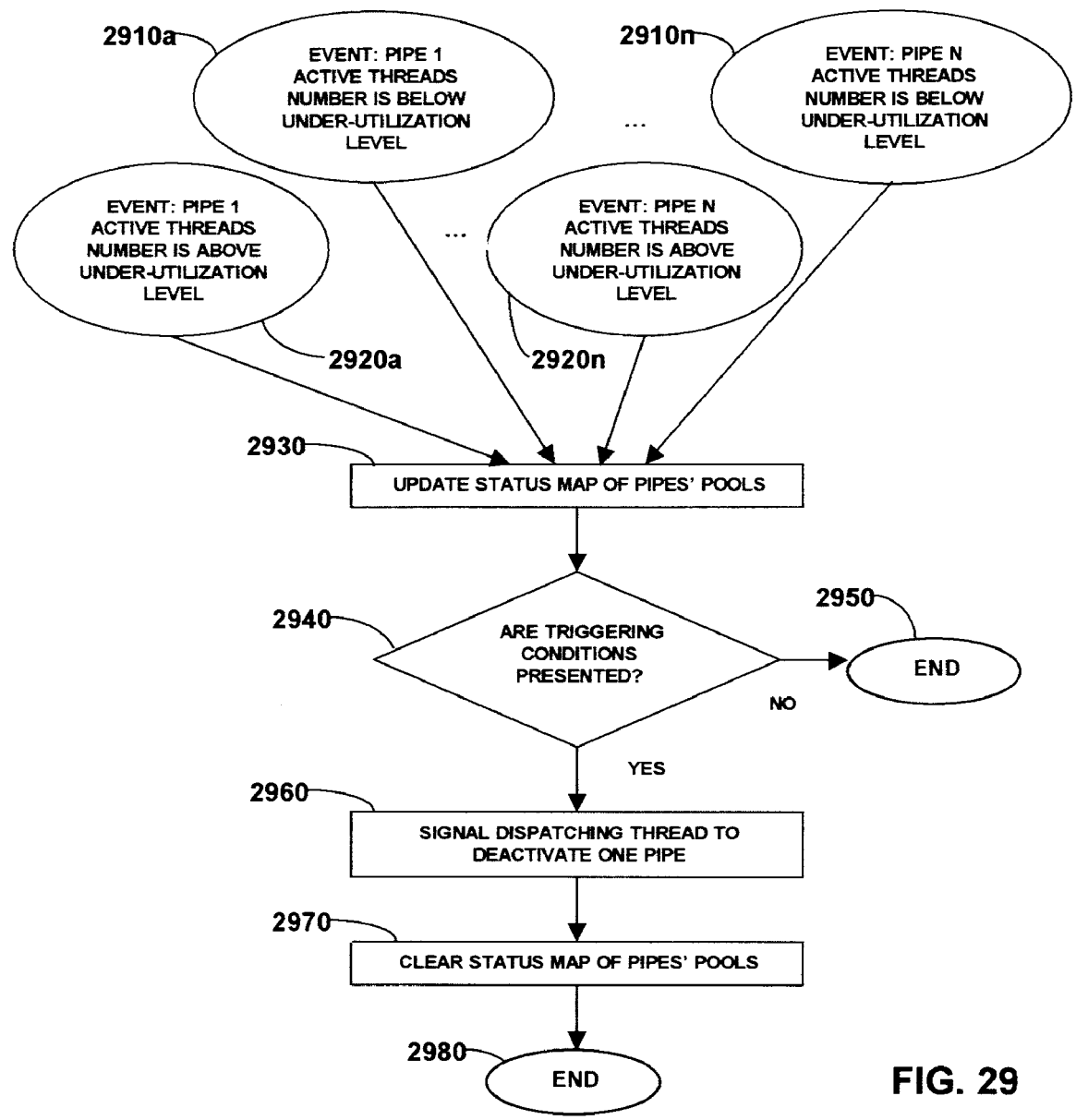
FIG. 29 is flowchart showing preferred steps performed by apparatus for detection of threads under-utilization.

FIG. 29 is flowchart showing preferred steps performed by apparatus for detection of threads under-utilization. Apparatus execution can be started by anyone of events 2910 generated when number of ACTIVE processing threads of a processing-pipe drops below under-utilization level, or by anyone of events 2920 generated when pipe's number of ACTIVE processing threads goes above the under-utilization level. After starting, first performed step is 2930 updating status map of pools of all activated processing-pipes 2823 on FIG. 28 belonging to workflow-activity processing structure 2820. Next performed step is 2940 checking for triggering conditions being presented. Execution started by an event 2920 inevitably returns NO during checking at step 2940 and ends by performing step 2950. Execution started by an event 2910 might lead to checking at step 2940 returning YES. In this case, next performed step 2960 signals workflow-activity' s dispatching thread to deactivate one processing-pipe, followed by step 2970 to clear status map of processing-pipes' pools.

Figure 30:
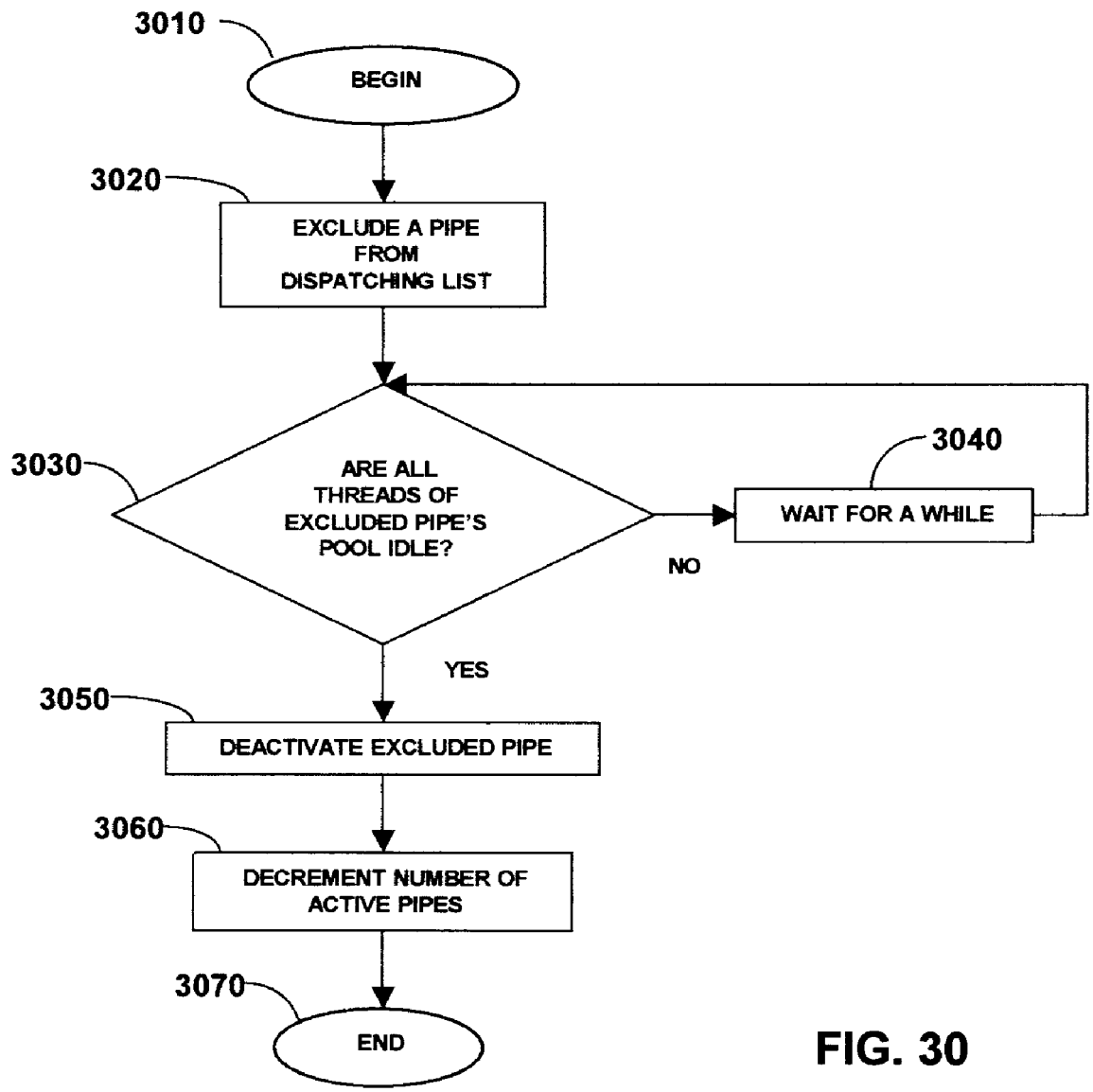
FIG. 30 is flowchart showing preferred steps performed by apparatus for scaling down processing capacity of a workflow-activity.

FIG. 30 is flowchart showing preferred steps performed by apparatus for scaling down processing capacity of a workflow-activity. First performed step 3020 sends a signal to the workflow-activity dispatching thread to exclude a processing-pipe from its dispatching list. Next performed step 3030 checks whether all threads belonging to excluded processing-pipe are with status IDLE. If NO, then next performed step is 3040, causing some delay giving time to ACTIVE processing threads belonging to excluded processing-pipe to finish their jobs and terminate, before performing step 3030 for another checking. If result of step 3030 checking is YES, then next performed step 3050 deactivates excluded processing-pipe, followed by step 3060 to decrement workflow-activity's counter of active processing-pipes.

Final element of this invention is its system for realtime visualization of quantity, structure, and utilization of hierarchical structure of threads as they participate in processing of workflow requests. Threads forming the upper two levels of application's hierarchical structure of threads are not interesting for visualization since their quantity, type and status does not change after application is activated and before application is terminated. There is always one application supervising thread and total number of dispatching and synchronizing-dispatching threads is equal to number of workflow-activities. Additionally, where application's main flow of control shows more then one control connectors having common destination node, the workflow-activity represented by this node will have synchronizing-dispatching thread, otherwise it will have dispatching thread. Threads forming First and Second levels of hierarchical structure of threads is where run-time changes happen and therefore hierarchical structure's adaptation-behavior-enacted modifications of First and Second levels are important for visualization. Visualization might be used as indicator of workload, indicator of points of delay caused by distributed infrastructure, and for observation and analysis of adaptive behavior of hierarchical structure of threads.

Main visualization window shows application's workflow-activities as individual icons. Within a workflow-activity icon, activated processing-pipes and processing-pipe objects with no associated threads are visible. Color of an activated processing-pipe indicates whether it is included in workload balancing list or not. Mouse clicking on a workflow-activity icon creates a new window getting one level deeper inside the workflow-activity by showing a more detailed picture of that workflow-activity. In this picture all processing-pipes objects are represented with an individual icon. Within the icon of an activated processing-pipe one with associated threads created and running, what is visible is processing-pipe's private pool of processing threads. For the sake if simplicity, what is visible inside a processing-pipe is just the images of active processing threads. An empty space inside a processing-pipe pool of threads indicates running but idle processing thread one expecting to be assigned a piece of work. Diagrams visible inside icons of main visualization window and workflow-activity visualization window are snapshots expressing current status at the moment of taking those snapshots. Snapshots are obtained by periodical polling the workflow application via interface provided for this purpose. A user-interface thread periodically polls with a manually tunable frequency of polling, thereby providing a tool for reducing consumed CPU time during periods of high workload.

Figure 31:
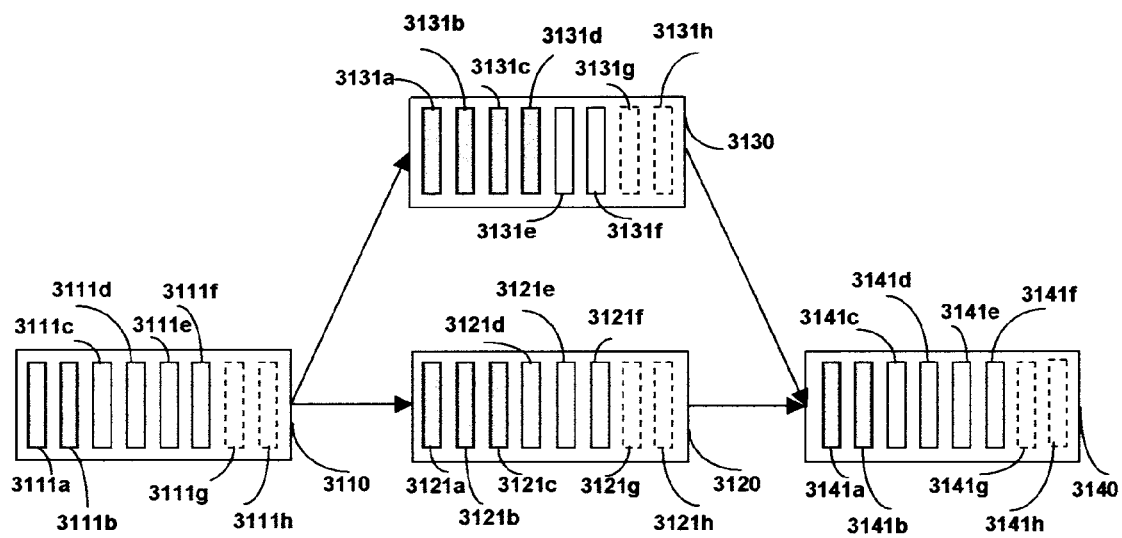
FIG. 31 is a diagram visualizing a sample workflow application with a snapshot of distribution of supervising threads per workflow-activity at a particular moment of time.

FIG. 31 is a diagram visualizing a sample workflow application with a snapshot of threads of second level of its hierarchical structure of threads at a particular moment of time. It shows main flow-graph of a sample workflow-process comprising 4 workflow-activities, where the only workflow-activity requiring synchronization of incoming to it flows of control is the one represented as flow-graph node 3140. FIG. 31 indirectly says that there are three dispatching threads and one synchronizing-dispatching thread. Every rectangle, being a node representing a workflow-activity, includes a block diagram showing workflow-activity's number of activated processing-pipes, number of activated but non-active processing-pipes, and number of processing-pipe objects with no associated threads. The rectangle of workflow-activity 3110 includes a block diagram consisting of 8 rectangles 3111*a* to 3111*h*. 3111*a* and 3111*b* represent activated processing-pipes in workflow-activity 3110, therefore it shows number of supervising threads in hierarchy belonging to workflow activity 3110 involved in workload processing. Processing-pipes represented by 3111*c* to 3111*f* activated but non-active processing-pipes. A processing-pipe might be activated but non-active after it has been excluded from dispatching list, and immediately before its deactivation. Deactivation of a processing-pipe terminates all processing-pipe threads. 3111*g* and 3111*h* represent processing-pipe object with no threads of hierarchical structure of threads associated to it. The entire set of rectangles 3111*a* to 3111*h* represents the maximum number of processing-pipes that might be activated for workflow-activity 3110 e.g. the entire performance capacity that might be adaptively constructed and devoted to workflow-activity 3110 under heaviest workload conditions.

Figure 32:
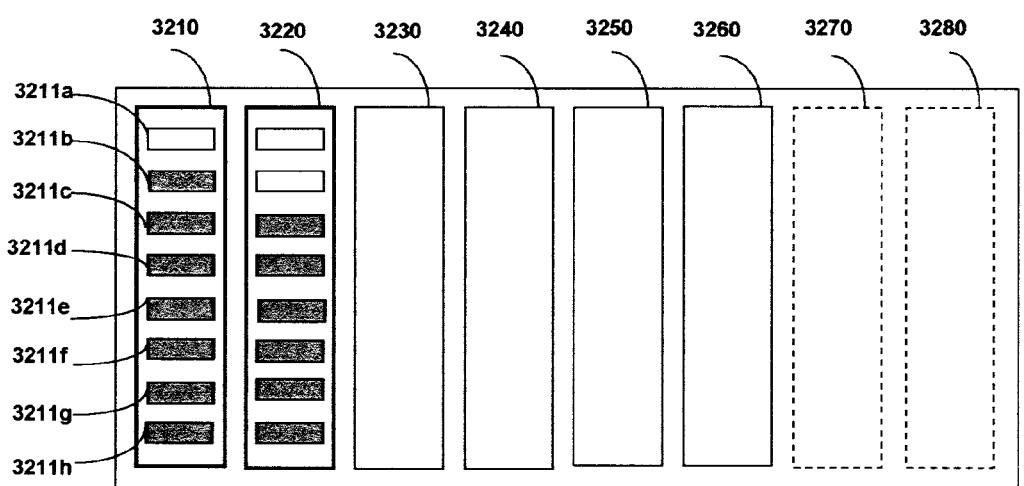
FIG. 32 is block diagram visualizing a sample workflow-activity with a snapshot of its processing threads at a particular moment of time.

FIG. 32 is block diagram visualizing a sample workflow-activity with a snapshot of its threads of first level of hierarchical structure of threads at a particular moment of time. It shows workflow-activity's number of active processing-pipes two on the diagram 3210 and 3220, number of activated but non-active processing-pipes four on the diagram 3230, 3240, 3250, and 3260, and number of processing-pipe objects with no associated threads two on the diagram 3270 and 3280. Within each active processing-pipe it shows processing-pipe's number of active processing threads and number of idle processing threads. For example, processing-pipe 3210 has seven active processing threads 3211*b* to 3211*h*, and one idle processing thread 3211*a*. Generally, idle processing threads are not shown for the sake of simplicity. A real visualization icon will not show processing thread 3211*a* and the two idle processing threads in processing-pipe 3220. Processing-pipes with no active processing, where all processing threads are idle, will appear as processing-pipes 3230 to 3260 are presented on FIG. 32.

The invention claimed is:

1. A computer-implemented method for graphical development of fully executable workflow applications, wherein said fully executable workflow applications are stored in a form of computer-executable program code in computer memory, a processor runs the workflow operation by invoking said program code, said program code facilitates processing of workflow orders, wherein said method for graphical development comprises the following steps:
  (A) Describing an element of workflow-process graphically with software that accepts interactive user input;
  (B) Interpreting the user input to obtain workflow-related data and transforming obtained workflow-related data into an incremental modification of incrementally constructed set of class objects that represents a workflow-process description;
  (C) Repeating steps (A) and (B) in a loop until workflow-process description is complete;
  (D) Extracting workflow-process-related data from the set of class objects and transforming the extracted workflow-process-related data into a workflow-process definition;
  (E) Generating source code of the workflow application software, compiling instructions, and linking instruction from the workflow-process definition;
  (F) Compiling the source code of the workflow application software with the compiling instructions;
  (G) Linking result of the performed compiling with generated linking instructions;
and
wherein said method further comprises defining a workflow-process comprising the following steps:
  (a) Establishing a matrix of workflow-activities, wherein said workflow-activities are individual items of work comprised by a potential workflow-process where all transactional operations potentially performed by each one of said individual items are potentially executed as a single transaction within each one of said workflow-activities of said potential workflow-process, and wherein said establishing the matrix further comprises:
    (i) Arranging workflow-activities comprised by the workflow-process being defined according to required sequence of execution of said workflow-activities within said workflow-process and according to possibilities for concurrent execution of some of said workflow-activities within said workflow-process;
    (ii) Defining a constant, named PROCESS_STEPS, representing a number of sequential steps of execution of a workflow-process being defined, wherein on each one of said sequential steps of execution either one activity is executed, or either two or more activities are executed concurrently;
    (iii) Defining a constant, named MAX_STEP_DEPTH, representing a maximum number of workflow-activities executed concurrently on one step of workflow-process being defined;
    (iv) Declaring and initializing a two-dimensional array of Boolean elements being a workflow-activities matrix, with dimensions MAX_STEP_DEPTH by PROCESS_STEPS, wherein an array element with value TRUE represents existence of a workflow-activity on position in said workflow-activities-matrix with coordinates equal to said array element indexes and wherein an array element with value FALSE represents non-existence of a workflow-activity on position in said workflow-activities with coordinates equal to said array element indexes;
  (b) Defining a main flow-graph, wherein the defining matrix of workflow-activities are further being represented as nodes of said flow-graph by incorporating control-connectors in order to represent a potential flow-of-control between said nodes within a potential workflow-process, wherein each said control-connector signals successful execution of its sourcing workflow-activity with execution result having value TRUE, wherein two or more control-connectors sourcing from one of said nodes initiate concurrent execution of destination nodes of said control-connectors, wherein two or more control-connectors having a common destination node impose a requirement for synchronizing conjunction of signals of all control-connectors incoming to said common destination node in order to trigger execution of said common destination node, wherein said defining the main flow-graph further comprises:
    (i) Defining a constant, named MAX_CONNECT_OUT, representing maximum number of main control-connectors sourcing from one flow-graph node representing a workflow-activity in workflow-process being defined;
    (ii) Declaring and initializing a two-dimensional array of integer elements with dimensions MAX_CONNECT_OUT by 2 per workflow-activity for each one of activities belonging to workflow steps with numbers from 1 to (PROCESS_STEPS-1), wherein values of each pair of elements of said array represent indexes of the initialized two-dimensional array of workflow-activities and thereby describe a position of a workflow-activity in said workflow-activities matrix,
    wherein said described positions of MAX_CONNECT_OUT workflow-activities in said workflow-activities matrix are positions of destination workflow-activities of MAX_CONNECT_OUT control-connectors having common source workflow-activity with potential execution result having value TRUE;
  (c) Defining one or more alternative control connectors, wherein each one of said alternative control connectors signals successful execution of its sourcing workflow-activity with execution result having value FALSE, wherein two or more of said alternative control-connectors sourcing from same workflow-activity initiate concurrent execution of destination workflow-activities of said alternative control-connectors, wherein a workflow-activity having established during the defining main flow-graph a requirement for synchronizing conjunction of signals of all incoming to it control-connectors cannot be a destination workflow-activity of an alternative control connector, wherein defining the one or more alternative control-connectors further comprises:
    (i) Defining a constant, named MAX_ALTCONNECT_OUT, representing maximum number of alternative control-connectors sourcing from one flow-graph node representing a workflow-activity in workflow-process being defined;
    (ii) Declaring and initializing a two-dimensional array of integer elements with dimensions MAX_ALTCONNECT_OUT by 2 per workflow-activity for each one of activities belonging to workflow steps with numbers from 1 to (PROCESS_STEPS-1), wherein values of each pair of elements of said array represent indexes of the initialized two-dimensional array of workflow-activities and thereby describe the position of a workflow-activity in said workflow-activities matrix, wherein said described positions of MAX_ALTCONNECT_OUT workflow-activities in said workflow-activities matrix are positions of destination workflow-activities of MAX_ALTCONNECT_OUT control-connectors having common source workflow-activity with potential execution result having value FALSE;

(d) Defining workflow-components matrix, wherein every element of said workflow-components matrix represents a software component, associated with a workflow-activity of workflow-process being defined, for potential plugging for execution as part of a potential single transaction within said workflow-activity of the workflow-process, wherein the defining of the workflow-component matrix further comprises:
  (i) Declaring a two-dimensional array of elements of type UUID (Universal Unique Identifier, interchangeable with the term GUID, Globally Unique Identifier) with dimensions identical to dimensions of the declared two-dimensional array representing workflow-activities matrix;
  (ii) Initializing elements of the declared array in the following manner: for every element of said array representing the workflow-activities matrix with value TRUE to be initialized corresponding element with identical indexes in array representing workflow-components matrix with UUID value representing a software component to be associated with represented workflow-activity, and for every element of said array representing workflow-activities matrix with value FALSE to be initialized corresponding element with identical indexes in array representing workflow-components matrix with UUID value indicating a dummy UUID.

2. A computer-implemented method for graphical development of fully executable workflow applications as per claim 1, said method further involves interpreting workflow process definition data and a parameterized executing of functions that provide software source code building blocks, wherein said parameterized executing of functions comprises:
  (A) Executing of functions that build software source code skeleton;
  (B) Executing of a function that builds part of software source code that declares a set of variables and initializes these variables with relevant data from said workflow-process definition;
  (C) Executing of a function that builds part of software source code verifying that the necessary workflow components according to the workflow process definition data are registered and available on a computer where workflow application will potentially be executed;
  (D) Executing of a function that builds part of the software source code responsible for the construction of class objects that represent workflow configuration according to the workflow-process definition data;
  (E) Executing of a function that builds compiling and linking instructions.

3. A software product stored in a computer storage medium, executed by processor for transactional processing of workflow comprising:
  (A) System skeleton as a hierarchical tree of class objects with capacity to represent a variety of workflow configurations, wherein:
    Said class objects are computer memory instances of classes or structures;
    Any level of said hierarchical tree contains one or multiple collections and each said collection contains a predefined or dynamically defined number of one or multiple objects, wherein objects belonging to any said collection of same hierarchy level are computer memory instances of classes or structures of identical type;
    First level of said hierarchical tree consists of a single collection and every next level of hierarchy contains one or multiple collections and individual objects, wherein said collections and said individual objects are accessible via references controlled by objects belonging to collections from previous level;
    Wherein said hierarchical tree of class objects contains the following levels and siblings;
    (i) First level, a steps-collection, wherein collection objects represent steps of said workflow-process, each said object being parent of a Second level collection;
    (ii) Second level, an activities-collection per step of said workflow-process, wherein said collection objects represent workflow-activities that might be executed concurrently with all other workflow-activities represented by objects belonging to the same collection, wherein each object is a parent of Third level siblings, said siblings being of 3 distinct categories: a processor collection, a workload-dispatching balancer object, and a work-flow-synchronization object;
    (iii) Third level's sibling One, a processor-collection per workflow-activity, wherein an object of said collection represents an individual workload-processing squad having a capacity to process a portion of entire workload specific for said workflow-activity, each said object being parent of a Fourth level collection;
    (iv) Third level's sibling Two, a workload-dispatching object per workflow-activity;
    (v) Third level's sibling Three, a workflow-synchronizing object per workflow-activity if required by flow-graph of said workflow-process, wherein said object contains data defining required synchronization scheme;
    (vi) Fourth level, a processing-thread-dedicated objects collection, where an object of said collection represents a dedicated area for data holding and data exchange between threads.
  (B) Means for splitting of a control flow by launching one or more new parallel control flows, wherein said parallel control flow comprises execution of at least one workflow-activity, or sequence of plurality of workflow-activities, before joining with its launching, or other, flow of control, wherein said parallel control flow launches one or more new parallel control flows, wherein a workflow-activity, that is part of a parallel control flow, generates notification message to synchronizing thread at control flow join-point with other control flow or plurality of control flows about a potential result with value FALSE of its execution, wherein a workflow-activity that is part of a parallel control flow further splitting one or more times, generates notification messages to synchronizing threads at splitting branches join-points with other control flows about a potential result with value FALSE of its execution, wherein synchronizing threads generate notification messages to synchronizing threads responsible for join-point of synchronized control flow with one or more control flows or to synchronizing threads responsible for join-points of said synchronized control flow's splitting branches about termination of said synchronized control flow.

4. A software product as per claim 3, further including means for synchronization of two or more parallel control flows before execution of next in flow-graph workflow-activity according to a synchronization scheme, wherein said synchronization scheme is a conjunction of events signaling completed execution of all workflow-activities represented by sourcing nodes of two or more flow-graph control connectors with destination node being said workflow-activity that will be executed after said synchronization as part of a potential single workflow-request, wherein implementation of said means for synchronization applies to entire multitude of concurrently processed potential workflow-requests.

5. A software product as per claim 4, further including means for launching of alternative control flow routes, wherein said launching takes place where potential execution of a workflow-activity has a result with value FALSE, wherein said alternative control flow routes redirect workflow execution from its normal routes by transferring execution control to one or more workflow-activities with non-synchronized execution, wherein an alternative control-connector launching an alternative control flow route and bypassing one or more workflow-activities with synchronized execution, is coupled with notification-connectors having same source node as said alternative control-connector, wherein each one of said notification-connectors has one of bypassed workflow activities with synchronized execution as its destination node.

6. A software product as per claim 5, further including construction of hierarchical structure of threads with four levels providing capacity for concurrent processing of multitude of workflow instances, wherein in said hierarchical structure levels below top level are organized as multitude of horizontally arranged divisions, wherein each said division is autonomous and self-contained in conducting its tasks, wherein top level thread is responsible for making adaptive decisions, and executing and supervising adaptive behavior related to allocation and de-allocation of computer and operating system resources based on its own assessment of application needs, wherein said capacity for concurrent processing of multitude of workflow instances is limited only by environmental factors such as availability of reserve of system memory and unused CPU power and ability of networking infrastructure to cope with generated traffic, wherein said hierarchical structure of threads contains following levels:
 (A) First level, formed by created and activated processing threads, wherein threads forming this level of said hierarchical structure are directly responsible for transactional processing of requests for work and for transactional flow of control between workflow-activities;
 (B) Second level, formed by created and activated supervising threads, wherein threads forming this level of said hierarchical structure are responsible for assignment of requests to individual processing threads and supervision of requests' execution;
 (C) Third level, formed by all dispatching or synchronizing-dispatching threads being created and activated according to number of workload-dispatching objects in hierarchical tree of class objects and number of workflow-synchronizing objects in hierarchical tree of class objects, wherein dispatching threads being part of Third level are responsible for dispatching of requests to supervising threads, wherein synchronizing-dispatching threads being part of Third level are responsible for synchronization of execution of parallel control flows and for dispatching of requests to supervising threads;
 (D) Fourth level, wherein Fourth level is hierarchy's top level and comprises only one thread being responsible for making, executing and supervising decisions about allocation and de-allocation of system resources based on its own assessment, wherein said allocation and de-allocation takes form of modification of First and Second levels of hierarchical structure of threads and their corresponding objects and collections of hierarchical tree of class objects.

7. A software product as per claim 6, further including means for workload balancing structured at two levels, wherein upper level of said workload balancing comprises multitude of associations between a dispatching thread and multitude of supervising threads and involves dispatching thread balancing workload between its associated supervising threads, wherein lower level of said workload balancing comprises multiple groupings of processing threads in pools associated with a supervising thread per pool and involves supervising threads balancing workload between processing threads of their associated pools.

8. A software product as per claim 7, further including means for software bottlenecks' prevention and neutralizing, wherein said software bottlenecks' prevention involves encapsulation of a thread pool containing fixed number of processing threads with a supervising thread in a processing-pipe, wherein said software bottlenecks neutralizing comprises construction of additional processing-pipes and inclusion of constructed additional processing-pipes in workload balancing process related to workflow-activity where development of bottleneck has been detected.

9. A software product as per claim 8, further including means for detection of conditions requiring scaling up of available capacity for processing of concurrent workflow, wherein said detection in regard to a particular workflow-activity involves checking for conjunction of events, from all processing-pipes associated to said workflow-activity, signaling that number of idle threads in processing-pipe's pool reached its critical minimum.

10. A software product as per claim 9, further including means for scaling up of available capacity for processing of concurrent workflow, wherein said scaling up is triggered at a particular workflow-activity to counteract development of a bottleneck at that particular workflow-activity and triggered at all workflow-activities for higher workflow processing responsiveness when workload increases, wherein said scaling up involves creation and activation of an additional processing-pipe and inclusion of said additional processing-pipe in workload balancing scheme.

11. A software product as per claim 10, further including means for detection of conditions requiring scaling down of available capacity for processing of concurrent workflow, wherein said detection in regard to a particular workflow-activity involves checking for conjunction of events, from all processing-pipes associated to said workflow-activity, signaling that number of busy threads in processing-pipe's pool reached its critical minimum.

12. A software product as per claim 11, further including means for scaling down of available capacity for processing of concurrent workflow, wherein said scaling down is triggered to counteract a detected inefficiency in use of system memory and CPU time-slice allocated to threads.

13. A software product as per claim 12, further including class objects for real-time visualization of quantity, structure, and utilization of threads forming First and Second levels of hierarchical structure of threads and said hierarchical structure's adaptation-enacted modifications of its First and Second levels, wherein said visualization serves as indicator of workload volume, indicator of points of delay caused by distributed infrastructure, and for observation and analysis of adaptive behavior of hierarchical structure of threads.

14. A computer-implemented method for transactional plugging of software components into a workflow-activity of a workflow-process at runtime, wherein said transactional plugging facilitates inclusion of all transactional operations, performed by invoking a method of plugged software component, into each transaction initiated by each workflow instance for execution of said workflow-activity, wherein said method for transactional plugging comprises the steps of:

(A) Creation and initialization of processing threads, wherein during its initialization each said processing thread instantiates a non-transactional component object and sends to it an amount of data being constant between processing of individual workflow requests and being necessary to perform execution of relevant portion of workflow request that will potentially be assigned to said processing thread;

(B) The instantiated non-transactional component object instantiates its own transactional component-intercepting object, and with CUID (Globally Unique Identifier) of a workflow-activity software component, sent to it as a parameter, instantiates a workflow-activity component-intercepting object;

(C) Supervising thread receives potentially arriving multitudes of single workflow requests and assigns each one of said requests to an individual processing thread of its pool;

(D) A Processing thread having an assigned request for work invokes a method of its non-transactional component object;

(E) Calling a method of the transactional component-intercepting object that belongs to the non-transactional component object, constructs a transactional component object thereby creating a new transaction and calls a method of said transactional component;

(F) Calling a method of the workflow-activity component-intercepting object by the transactional component object, instantiates a workflow-activity software component and invokes its method, which performs all of its transactional operations as members of the created new transaction.

15. A computer storage medium containing instructions, said instructions when executed by a processor carry out the methods of:

Accepting interactive user input for a graphical description of a workflow process, the instructions further performing:

(A) Describing an element of workflow-process graphically with software that accepts interactive user input;
(B) Interpreting the user input to obtain workflow-related data and transforming obtained data into an incremental modification of incrementally constructed set of class objects that represents workflow-process description;
(C) Repeating steps (A) and (B) in a loop until workflow-process description is complete.
(D) Extracting workflow-process-related data from the set of class objects and transforming the extracted workflow-process-related data into a workflow-process definition;
(E) Generating source code of the workflow application software, compiling instructions, and linking instruction from the workflow-process definition;
(F) Compiling the source code of the workflow application software with the compiling instructions:
(G) Linking result of the performed compiling with generated linking instructions.

Creating workflow process definition comprising:
(a) Establishing a matrix of workflow-activities, wherein said workflow-activities are individual items of work comprised by a potential workflow-process where all transactional operations potentially performed by each one of said individual items are potentially executed as a single transaction within each one of said workflow-activities of said potential workflow-process, and wherein said establishing the matrix further comprises:
 (i) Arranging workflow-activities comprised by the workflow-process being defined according to required sequence of execution of said workflow-activities within said workflow-process and according to possibilities for concurrent execution of some of said workflow-activities within said workflow-process;
 (ii) Defining a constant, named PROCESS_STEPS, representing a number of sequential steps of execution of a workflow-process being defined, wherein on each one of said sequential steps of execution either one activity is executed, or either two or more activities are executed concurrently;
 (iii) Defining a constant, named MAX_STEP_DEPTH, representing a maximum number of workflow-activities executed concurrently on one step of workflow-process being defined;
 (iv) Declaring and initializing a two-dimensional array of Boolean elements being a workflow-activities matrix, with dimensions MAX_STEP_DEPTH by PROCESS_STEPS, wherein an array element with value TRUE represents existence of a workflow-activity on position in said workflow-activities matrix with coordinates equal to said array element indexes and wherein an array element with value FALSE represents nonexistence of a workflow-activity on position in said workflow-activities with coordinates equal to said array element indexes.
(b) Defining a main flow-graph, wherein the defining matrix of workflow-activities are further being represented as nodes of said flow-graph by incorporating control-connectors in order to represent a potential flow-of-control between said nodes within a potential workflow-process, wherein each said control-connector signals successful execution of its sourcing workflow-activity with execution result having value TRUE, wherein two or more control-connectors sourcing from one of said nodes initiate concurrent execution of destination nodes of said control-connectors, wherein two or more control-connectors having a common destination node impose a requirement for synchronizing conjunction of signals of all control-connectors incoming to said common destination node in order to trigger execution of said common destination node, wherein said defining the main flow-graph further comprises:
  (i) Defining a constant, named MAX_CONNECT_OUT, representing maximum number of main control-connectors sourcing from one flow-graph node representing a workflow-activity in workflow-process being defined;
  (ii) Declaring and initializing a two-dimensional array of integer elements with dimensions MAX_CONNECT_OUT by 2 per workflow-activity for each one of activities belonging to workflow steps with numbers from 1 to (PROCESS$_{13}$ STEPS-1), wherein values of each pair of elements of said array represent indexes of the initialized two-dimensional array of workflow-activities and—thereby describe a position of a workflow-activity in said workflow-activities matrix, wherein said described positions of MAX_CONNECT_OUT workflow-activities in said workflow-activities matrix are positions of destination workflow-activities of MAX_CONNECT_OUT control-connectors having common source workflow-activity with potential execution result having value TRUE;
(c) Defining one or more alternative control connectors, wherein each one of said alternative control connectors signals successful execution of its sourcing workflow-activity with execution result having value FALSE, wherein two or more of said alternative control-connectors sourcing from same workflow-activity initiate concurrent execution of destination workflow-activities of said alternative control-connectors, wherein a workflow-activity having established during the defining main flow-graph a requirement for synchronizing conjunction of signals of all incoming to it control-connectors cannot be a destination workflow-activity of an alternative control connector, wherein defining the one or more alternative control-connectors further comprises:
  (i) Defining a constant, named MAX_ALTCONNECT_OUT, representing maximum number of alternative control-connectors sourcing from one flow-graph node representing a workflow-activity in workflow-process being defined;
  (ii) Declaring and initializing a two-dimensional array of integer elements with dimensions MAX_ALTCONNECT_OUT by 2 per workflow-activity for each one of activities belonging to workflow steps with numbers from 1 to (PROCESS_STEPS-1), wherein values of each pair of elements of said array represent indexes of the initialized two-dimensional array of workflow-activities and—thereby describe the position of a workflow-activity in said workflow-activities matrix, wherein said described positions of MAX_ALTCONNECT_OUT workflow-activities in said workflow-activities matrix are positions of destination workflow-activities of MAX_ALTCONNECT_OUT control-connectors having common source workflow-activity with potential execution result having value FALSE;
(d) Defining workflow-components matrix, wherein every element of said workflow-components matrix represents a software component, associated with a workflow-activity of workflow-process being defined, for potential plugging for execution as part of a potential single transaction within said workflow-activity of the workflow-process, wherein the defining of the workflow-component matrix further comprises:
  (i) Declaring a two-dimensional array of elements of type UUID (Universal Unique Identifier, interchangeable with the term GUID, Globally Unique Identifier) with dimensions identical to dimensions of the declared two-dimensional array representing workflow-activities matrix;
  (ii) Initializing elements of the declared array in the following manner: for every element of said array representing the workflow-activities matrix with value TRUE to be initialized corresponding element with identical indexes in array representing workflow-components matrix with UUID value representing a software component to be associated with represented workflow-activity, and for every element of said array representing workflow-activities matrix with value FALSE to be initialized corresponding element with identical indexes in array representing workflow-components matrix with UUID value indicating a dummy UUID;
and
Generating source code and compiling and linking instructions sufficient to build fully executable workflow applications by:
  (A) Executing of functions that build software source code skeleton;
  (B) Executing of a function that builds part of software source code that declares a set of variables and initializes these variables with relevant data from said workflow-process definition;
  (C) Executing of a function that builds part of software source code verifying that the necessary workflow components according to workflow-process definition data are registered and available on a computer where the workflow application will potentially be executed;
  (D) Executing of a function that builds part of the software source code responsible for the construction of class objects that represent workflow configuration according to the workflow-process definition data;
  (E) Executing of a function that builds compiling and linking instructions.

* * * * *